US012717459B2

(12) United States Patent
Richardson et al.

(10) Patent No.: US 12,717,459 B2
(45) Date of Patent: Aug. 25, 2026

(54) TECHNIQUES FOR THREE-DIMENSIONAL ENVIRONMENTS

(71) Applicant: Apple Inc., Cupertino, CA (US)

(72) Inventors: Andrew P. Richardson, San Francisco, CA (US); Christian A. Niles, Cupertino, CA (US); Collin R. Russell, Cupertino, CA (US); Abhinay Ashutosh, Sunnyvale, CA (US); Mark A. Ebbole, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 229 days.

(21) Appl. No.: 18/622,447

(22) Filed: Mar. 29, 2024

(65) Prior Publication Data

US 2024/0402872 A1 Dec. 5, 2024

Related U.S. Application Data

(60) Provisional application No. 63/471,209, filed on Jun. 5, 2023.

(51) Int. Cl.
*G06F 3/01* (2006.01)
*G06F 3/04815* (2022.01)

(52) U.S. Cl.
CPC .......... *G06F 3/04815* (2013.01); *G06F 3/013* (2013.01); *G06F 3/017* (2013.01)

(58) Field of Classification Search
CPC ...... G06F 3/04883; G06F 3/011; G06F 3/017; G06T 19/006
See application file for complete search history.

(56) References Cited

U.S. PATENT DOCUMENTS

| | | | |
|---|---|---|---|
| 8,452,600 | B2 | 5/2013 | Fleizach |
| 8,704,765 | B1 | 4/2014 | Murphy et al. |
| 9,294,819 | B2 | 3/2016 | Lee et al. |
| 9,804,733 | B2 | 10/2017 | Walline et al. |
| 10,489,459 | B1 | 11/2019 | Jastrzebski et al. |
| 10,997,963 | B1 | 5/2021 | Baligar et al. |
| 11,934,569 | B2 | 3/2024 | Pastrana Vicente et al. |
| 2007/0022389 | A1 | 1/2007 | Ording et al. |
| 2007/0022391 | A1 | 1/2007 | Kim et al. |
| 2008/0256477 | A1 | 10/2008 | Cho et al. |
| 2009/0123046 | A1 | 5/2009 | Mielekamp et al. |

(Continued)

FOREIGN PATENT DOCUMENTS

| | | | |
|---|---|---|---|
| AU | 2021239971 | A1 | 9/2022 |
| CN | 117873325 | A | 4/2024 |

(Continued)

OTHER PUBLICATIONS

European Patent Application No. 25180819.2; Extended Search Report; dated Aug. 14, 2025; 10 pages.

(Continued)

*Primary Examiner* — Rinna Yi
(74) *Attorney, Agent, or Firm* — Kyle B. Morse; Jerome Miller; BAKERHOSTETLER

(57) ABSTRACT

Some techniques are described herein for integrating a 2D framework with a 3D framework. Such techniques use a concept referred to as a hidden entity to link the two frameworks together. Other techniques are described herein for translating gestures from a first type to a second type in certain situations.

30 Claims, 8 Drawing Sheets

(56) References Cited

U.S. PATENT DOCUMENTS

| | | | |
|---|---|---|---|
| 2010/0003645 | A1 | 1/2010 | Hathaway |
| 2010/0192107 | A1 | 7/2010 | Takahashi |
| 2010/0306710 | A1 | 12/2010 | Poot |
| 2011/0197147 | A1 | 8/2011 | Fai |
| 2012/0293519 | A1 | 11/2012 | Ribble et al. |
| 2013/0019178 | A1 | 1/2013 | Morikawa et al. |
| 2013/0159939 | A1 | 6/2013 | Krishnamurthi |
| 2013/0162530 | A1 | 6/2013 | Takahashi |
| 2014/0079247 | A1 | 3/2014 | Sanders |
| 2014/0136518 | A1 | 5/2014 | Shum et al. |
| 2014/0173526 | A1 | 6/2014 | Pisaris-Henderson |
| 2014/0198040 | A1 | 7/2014 | Nicholson et al. |
| 2014/0313130 | A1 | 10/2014 | Yamano et al. |
| 2014/0359651 | A1 | 12/2014 | Lee et al. |
| 2015/0131855 | A1 | 5/2015 | Hanzawa et al. |
| 2015/0254905 | A1 | 9/2015 | Ramsby et al. |
| 2017/0068418 | A1 | 3/2017 | Tanaka |
| 2017/0150139 | A1 | 5/2017 | Lee et al. |
| 2017/0199585 | A1 | 7/2017 | Grenet |
| 2018/0046352 | A1 | 2/2018 | Johnson et al. |
| 2018/0081447 | A1 | 3/2018 | Gummadi et al. |
| 2018/0284872 | A1 | 10/2018 | Schluessler et al. |
| 2018/0330515 | A1 | 11/2018 | Stall et al. |
| 2019/0197785 | A1 | 6/2019 | Tate-Gans et al. |
| 2019/0247130 | A1 | 8/2019 | State et al. |
| 2019/0342425 | A1 | 11/2019 | Cheng et al. |
| 2020/0082493 | A1 | 3/2020 | Wang et al. |
| 2020/0320794 | A1 | 10/2020 | Huang et al. |
| 2021/0041956 | A1 | 2/2021 | Hasburgh |
| 2021/0089132 | A1 | 3/2021 | Mathur |
| 2021/0105306 | A1 | 4/2021 | Pavlou |
| 2021/0240332 | A1 | 8/2021 | Walkin et al. |
| 2022/0043960 | A1 | 2/2022 | Zhang et al. |
| 2022/0137713 | A1 | 5/2022 | Hu et al. |
| 2022/0214857 | A1 | 7/2022 | Lambourne et al. |
| 2022/0229534 | A1 | 7/2022 | Terre et al. |
| 2022/0253139 | A1 | 8/2022 | Berliner et al. |
| 2022/0255995 | A1* | 8/2022 | Berliner .............. G06F 3/04883 |
| 2023/0031439 | A1 | 2/2023 | Mindlin et al. |
| 2023/0074380 | A1 | 3/2023 | Kim et al. |
| 2023/0075560 | A1* | 3/2023 | Linville .................. G06F 3/017 |
| 2023/0094522 | A1 | 3/2023 | Stauber et al. |
| 2023/0100689 | A1 | 3/2023 | Chiu et al. |
| 2023/0146384 | A1 | 5/2023 | Terre et al. |
| 2023/0152935 | A1 | 5/2023 | McKenzie et al. |
| 2023/0165639 | A1 | 6/2023 | Dulin et al. |
| 2023/0315242 | A1 | 10/2023 | Rajasankar et al. |
| 2023/0315247 | A1 | 10/2023 | Pastrana Vicente et al. |
| 2023/0343048 | A1 | 10/2023 | Besecker et al. |
| 2025/0271856 | A1 | 8/2025 | Von Volkmann et al. |
| 2025/0301556 | A1 | 9/2025 | Mouilleseaux et al. |

FOREIGN PATENT DOCUMENTS

| | | | |
|---|---|---|---|
| EP | 3265883 | B1 | 2/2023 |
| WO | WO 2022/055822 | A1 | 3/2022 |
| WO | WO 2023/014618 | A1 | 2/2023 |

OTHER PUBLICATIONS

U.S. Appl. No. 18/619,568; Non-Final Office Action; dated Nov. 28, 2025; 19 pages.

Huynh et al.; “Layerable Apps: Comparing Concurrent and Exclusive Display of Augmented Reality Applications”; IEEE Int’l Symposium on Mixed and Augmented Reality; 2022; p. 857-863.

International Patent Application No. PCT/US2024/029855; Int’l Search Report and the Written Opinion; dated Sep. 18, 2024; 13 pages.

International Patent Application No. PCT/US2024/030462; Int’l Search Report and the Written Opinion; dated Sep. 30, 2024; 21 pages.

International Patent Application No. PCT/US2024/032394; Invitation to Pay Add’l Fees; dated Sep. 25, 2024; 20 pages.

International Patent Application No. PCT/US2024/032401; Int’l Search Report and the Written Opinion; dated Oct. 14, 2024; 16 pages.

International Patent Application No. PCT/US2024/030181; Int’l Search Report and the Written Opinion; dated Oct. 31, 2024; 21 pages.

International Patent Application No. PCT/US2024/032394; Int’l Search Report and the Written Opinion; dated Nov. 15, 2024; 23 pages.

International Patent Application No. PCT/US2024/047378; Invitation to Pay Add’l Fees; dated Dec. 20, 2024; 13 pages.

International Patent Application No. PCT/US2024/047378; Int’l Search Report and the Written Opinion; dated Feb. 10, 2025; 22 pages.

European Patent Application No. 25150841.2; Extended Search Report; dated Feb. 18, 2025; 10 pages.

European Patent Application No. 25180843.2; Extended Search Report; dated Jul. 14, 2025; 11 pages.

International Patent Application No. PCT/US2024/032401; Invitation to Pay Add’l Fees; Aug. 23, 2024; 17 pages.

“2GIG Edge™ Security & Smart Home System—User Guide”; https://2gig.com/wp-content/uploads/10029908-Rev-A-2GIG-Edge-User-Guide-0322_WEB.pdf; Nortek Security & Control LLC; © 2021; 60 pages.

“Get Back to Work Safely”; https://www.anviz.com/get-back-to-work-safely.html; Anviz Global Inc.; © 2023; accessed Sep. 10, 2024; 5 pages.

“Top 7 Use Cases for Facial Recognition in 2023”; https://www.cyberlink.com/faceme/insights/articles/228/how-to-use-facial-recognition; FaceMe; Mar. 2023; accessed Sep. 10, 2024; 12 pages.

International Patent Application No. PCT/US2024/030462; Invitation to Pay Add’l Fees; dated Aug. 9, 2024; 14 pages.

International Patent Application No. PCT/US2024/029952; Int’l Search Report and the Written Opinion; dated Sep. 12, 2024; 12 pages.

International Patent Application No. PCT/US2024/030181; Invitation to Pay Additional Fees; dated Sep. 10, 2024; 14 pages.

U.S. Appl. No. 18/678,955; Non-Final Office Action; dated Mar. 25, 2026; 9 pages.

U.S. Appl. No. 18/799,489; Non-Final Office Action; dated Dec. 11, 2025; 16 pages.

U.S. Appl. No. 18/618,806; Non-Final Office Action; dated Feb. 9, 2026; 12 pages.

* cited by examiner

TECHNIQUES FOR THREE-DIMENSIONAL ENVIRONMENTS

CROSS-REFERENCE TO RELATED APPLICATIONS

The present application claims priority to U.S. Provisional Patent Application Ser. No. 63/471,209, entitled "TECHNIQUES FOR THREE-DIMENSIONAL ENVIRONMENTS" filed Jun. 5, 2023, which is hereby incorporated by reference in its entirety for all purposes.

BACKGROUND

Electronic devices are becoming increasingly complex. For example, a single electronic device can utilize multiple frameworks for different situations. Ensuring that such frameworks work together and/or are able to be used together can be difficult. Accordingly, there is a need to improve techniques for facilitating operations.

SUMMARY

Current techniques for managing three-dimensional (3D) environments are generally ineffective and/or inefficient. For example, some techniques require frameworks for two-dimensional (2D) environments to be kept separate from frameworks for three-dimensional environments. Other techniques avoid this issue altogether and attempt to use a one-size fits all model that can result in issues. This disclosure provides more effective and/or efficient techniques for managing three-dimensional environments using an example of a single computer system. It should be recognized that other types of electronic devices can be used with techniques described herein. For example, a computer system relying on remote rendering of content can use techniques described herein. In addition, techniques optionally complement or replace other techniques for managing three-dimensional environments.

Some techniques are described herein for integrating a 2D framework with a 3D framework. Such techniques use a concept referred to as a hidden entity to link the two frameworks together. Other techniques are described herein for translating gestures from a first type to a second type in certain situations.

In some examples, a method that is performed by a computer system is described. In some examples, the method comprises: receiving, from an application, a request to add a two-dimensional entity at a first location in a three-dimensional environment, wherein the 3D environment includes one or more 3D entities; and in response to receiving the request to add the 2D entity at the first location in the 3D environment: adding a first 3D entity to the first location in the 3D environment; rendering, via a 2D framework, a representation of the 2D entity; and rendering, via a 3D framework, a representation of a second 3D entity by: performing one or more operations on the representation of the 2D entity; and placing the representation of the second 3D entity at the first location.

In some examples, a non-transitory computer-readable storage medium storing one or more programs configured to be executed by one or more processors of a computer system is described. In some examples, the one or more programs includes instructions for: receiving, from an application, a request to add a two-dimensional entity at a first location in a three-dimensional environment, wherein the 3D environment includes one or more 3D entities; and in response to receiving the request to add the 2D entity at the first location in the 3D environment: adding a first 3D entity to the first location in the 3D environment; rendering, via a 2D framework, a representation of the 2D entity; and rendering, via a 3D framework, a representation of a second 3D entity by: performing one or more operations on the representation of the 2D entity; and placing the representation of the second 3D entity at the first location.

In some examples, a transitory computer-readable storage medium storing one or more programs configured to be executed by one or more processors of a computer system is described. In some examples, the one or more programs includes instructions for: receiving, from an application, a request to add a two-dimensional entity at a first location in a three-dimensional environment, wherein the 3D environment includes one or more 3D entities; and in response to receiving the request to add the 2D entity at the first location in the 3D environment: adding a first 3D entity to the first location in the 3D environment; rendering, via a 2D framework, a representation of the 2D entity; and rendering, via a 3D framework, a representation of a second 3D entity by: performing one or more operations on the representation of the 2D entity; and placing the representation of the second 3D entity at the first location.

In some examples, a computer system comprising one or more processors and memory storing one or more programs configured to be executed by the one or more processors is described. In some examples, the one or more programs includes instructions for: receiving, from an application, a request to add a two-dimensional entity at a first location in a three-dimensional environment, wherein the 3D environment includes one or more 3D entities; and in response to receiving the request to add the 2D entity at the first location in the 3D environment: adding a first 3D entity to the first location in the 3D environment; rendering, via a 2D framework, a representation of the 2D entity; and rendering, via a 3D framework, a representation of a second 3D entity by: performing one or more operations on the representation of the 2D entity; and placing the representation of the second 3D entity at the first location.

In some examples, a computer system is comprising means for performing each of the following steps: receiving, from an application, a request to add a two-dimensional entity at a first location in a three-dimensional environment, wherein the 3D environment includes one or more 3D entities; and in response to receiving the request to add the 2D entity at the first location in the 3D environment: adding a first 3D entity to the first location in the 3D environment; rendering, via a 2D framework, a representation of the 2D entity; and rendering, via a 3D framework, a representation of a second 3D entity by: performing one or more operations on the representation of the 2D entity; and placing the representation of the second 3D entity at the first location.

In some examples, a computer program product is described. In some examples, the computer program product comprises one or more programs configured to be executed by one or more processors of a computer system. In some examples, the one or more programs include instructions for: receiving, from an application, a request to add a two-dimensional entity at a first location in a three-dimensional environment, wherein the 3D environment includes one or more 3D entities; and in response to receiving the request to add the 2D entity at the first location in the 3D environment: adding a first 3D entity to the first location in the 3D environment; rendering, via a 2D framework, a representation of the 2D entity; and rendering, via a 3D framework, a representation of a second 3D entity by:

performing one or more operations on the representation of the 2D entity; and placing the representation of the second 3D entity at the first location.

In some examples, a method that is performed at a computer system in communication with one or more input devices is described. In some examples, the method comprises: detecting, via the one or more input devices, a first input corresponding to a three-dimensional environment; in response to detecting the first input corresponding to the 3D environment: in accordance with a determination that a first set of one or more criteria is satisfied, wherein the first set of one or more criteria includes a criterion that is satisfied when the input is directed to a first entity of a first type in the 3D environment: translating the first input to a second input different from the first input; and sending, to a first application, an indication of the second input; and in accordance with a determination that a second set of one or more criteria is satisfied, wherein the second set of one or more criteria includes a criterion that is satisfied when the input is directed to a second entity of a second type in the 3D environment, sending, to a second application, an indication of the first input, wherein the second type of entity is different from the first type of entity, and wherein the second set of one or more criteria is different from the first set of one or more criteria.

In some examples, a non-transitory computer-readable storage medium storing one or more programs configured to be executed by one or more processors of a computer system in communication with one or more input devices is described. In some examples, the one or more programs includes instructions for: detecting, via the one or more input devices, a first input corresponding to a three-dimensional environment; in response to detecting the first input corresponding to the 3D environment: in accordance with a determination that a first set of one or more criteria is satisfied, wherein the first set of one or more criteria includes a criterion that is satisfied when the input is directed to a first entity of a first type in the 3D environment: translating the first input to a second input different from the first input; and sending, to a first application, an indication of the second input; and in accordance with a determination that a second set of one or more criteria is satisfied, wherein the second set of one or more criteria includes a criterion that is satisfied when the input is directed to a second entity of a second type in the 3D environment, sending, to a second application, an indication of the first input, wherein the second type of entity is different from the first type of entity, and wherein the second set of one or more criteria is different from the first set of one or more criteria.

In some examples, a transitory computer-readable storage medium storing one or more programs configured to be executed by one or more processors of a computer system in communication with one or more input devices is described. In some examples, the one or more programs includes instructions for: detecting, via the one or more input devices, a first input corresponding to a three-dimensional environment; in response to detecting the first input corresponding to the 3D environment: in accordance with a determination that a first set of one or more criteria is satisfied, wherein the first set of one or more criteria includes a criterion that is satisfied when the input is directed to a first entity of a first type in the 3D environment: translating the first input to a second input different from the first input; and sending, to a first application, an indication of the second input; and in accordance with a determination that a second set of one or more criteria is satisfied, wherein the second set of one or more criteria includes a criterion that is satisfied when the input is directed to a second entity of a second type in the 3D environment, sending, to a second application, an indication of the first input, wherein the second type of entity is different from the first type of entity, and wherein the second set of one or more criteria is different from the first set of one or more criteria.

In some examples, a computer system in communication with one or more input devices is described. In some examples, the computer system in communication with one or more input devices comprises one or more processors and memory storing one or more programs configured to be executed by the one or more processors. In some examples, the one or more programs includes instructions for: detecting, via the one or more input devices, a first input corresponding to a three-dimensional environment; in response to detecting the first input corresponding to the 3D environment: in accordance with a determination that a first set of one or more criteria is satisfied, wherein the first set of one or more criteria includes a criterion that is satisfied when the input is directed to a first entity of a first type in the 3D environment: translating the first input to a second input different from the first input; and sending, to a first application, an indication of the second input; and in accordance with a determination that a second set of one or more criteria is satisfied, wherein the second set of one or more criteria includes a criterion that is satisfied when the input is directed to a second entity of a second type in the 3D environment, sending, to a second application, an indication of the first input, wherein the second type of entity is different from the first type of entity, and wherein the second set of one or more criteria is different from the first set of one or more criteria.

In some examples, a computer system in communication with one or more input devices is described. In some examples, the computer system in communication with one or more input devices comprises means for performing each of the following steps: detecting, via the one or more input devices, a first input corresponding to a three-dimensional environment; in response to detecting the first input corresponding to the 3D environment: in accordance with a determination that a first set of one or more criteria is satisfied, wherein the first set of one or more criteria includes a criterion that is satisfied when the input is directed to a first entity of a first type in the 3D environment: translating the first input to a second input different from the first input; and sending, to a first application, an indication of the second input; and in accordance with a determination that a second set of one or more criteria is satisfied, wherein the second set of one or more criteria includes a criterion that is satisfied when the input is directed to a second entity of a second type in the 3D environment, sending, to a second application, an indication of the first input, wherein the second type of entity is different from the first type of entity, and wherein the second set of one or more criteria is different from the first set of one or more criteria.

In some examples, a computer program product is described. In some examples, the computer program product comprises one or more programs configured to be executed by one or more processors of a computer system in communication with one or more input devices. In some examples, the one or more programs include instructions for: detecting, via the one or more input devices, a first input corresponding to a three-dimensional environment; in response to detecting the first input corresponding to the 3D environment: in accordance with a determination that a first set of one or more criteria is satisfied, wherein the first set of one or more criteria includes a criterion that is satisfied when the input is directed to a first entity of a first type in the 3D environment: translating the first input to a second input different from the first input; and sending, to a first application, an indication of the second input; and in accordance with a determination that a second set of one or more criteria is satisfied, wherein the second set of one or more criteria includes a criterion that is satisfied when the input is directed to a second entity of a second type in the 3D environment, sending, to a second application, an indication of the first input, wherein the second type of entity is different from the first type of entity, and wherein the second set of one or more criteria is different from the first set of one or more criteria.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described examples, reference should be made to the Detailed Description below, in conjunction with the following drawings in which like reference numerals refer to corresponding parts throughout the figures.

DETAILED DESCRIPTION

Figure 1:
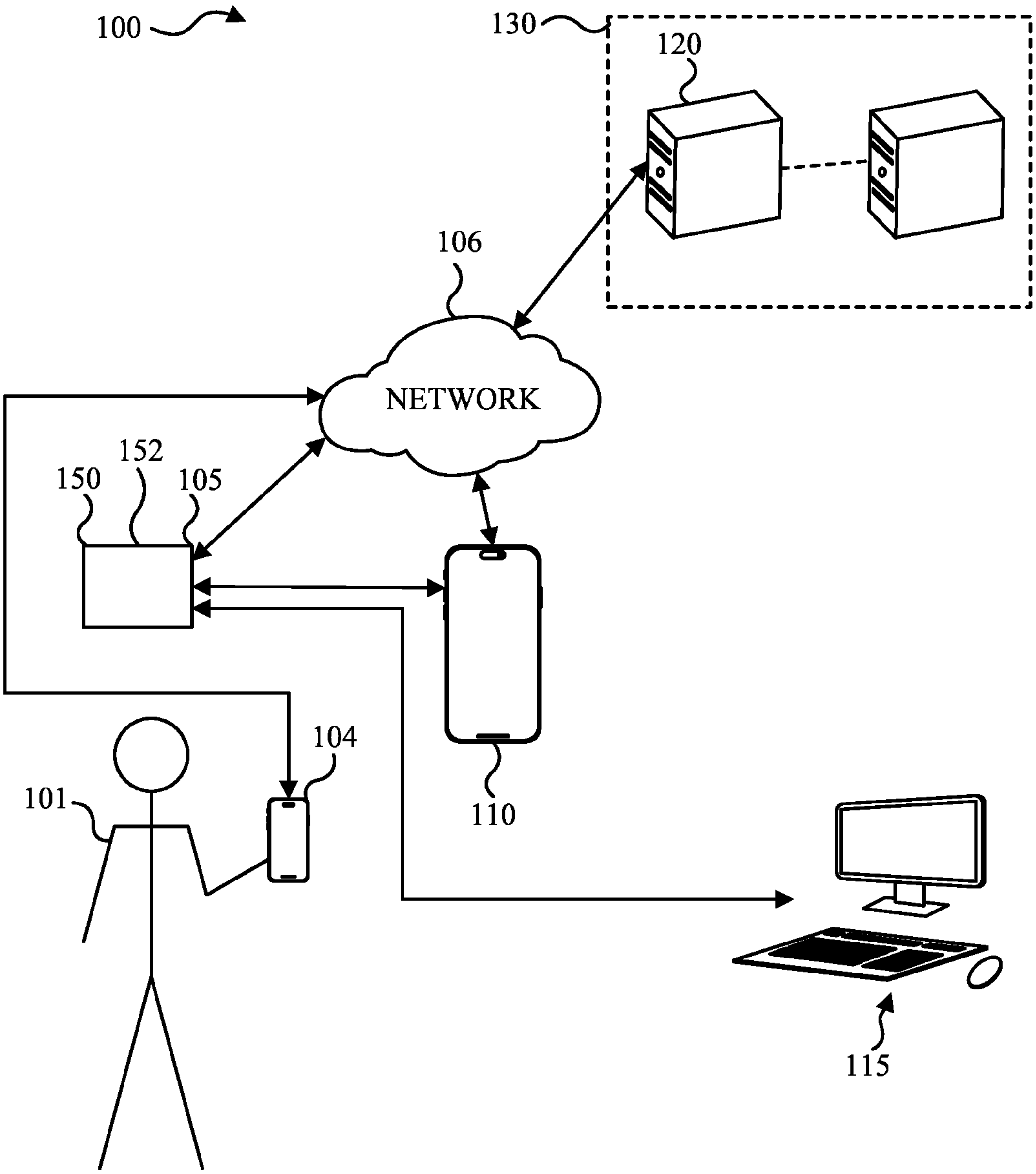
FIG. 1 illustrates an example system architecture including various electronic devices that may implement the subject system in accordance with some examples.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other examples. In some examples, structures and components are shown in block diagram form in order to avoid obscuring the concepts of the subject technology.

Methods and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," "third," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described examples. In some examples, the first subsystem and the second subsystem are two separate references to the same subsystem. In some examples, the first subsystem and the second subsystem are both subsystems, but they are not the same subsystem or the same type of subsystem.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some examples, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an example system architecture 100 including various electronic devices that may implement the subject system in accordance with some examples. Not all of the depicted components may be used in all examples, however, and some examples may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a smartphone, or as a head mountable portable system (e.g., worn by a user 101). The electronic device 105 includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In some examples, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.). For example, the electronic device 105 may include multiple cameras 150. For example, the multiple cameras 150 may include a left facing camera, a front facing camera, a right facing camera, a down facing camera, a left-down facing camera, a right-down facing camera, an up facing camera, one or more eye-facing cameras, and/or other cameras. Each of the cameras 150 may include one or more image sensors (e.g., charged coupled device (CCD) image sensors, complementary metal oxide semiconductor (CMOS) image sensors, or the like).

Further, the electronic device 105 may include various sensors 152 including, but not limited to, other cameras, other image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User inputs detected by such cameras, sensors, and/or hardware elements may correspond to, for example, various input modalities. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. In some examples, facial tracking, gaze tracking, hand tracking, gesture tracking, object tracking, and/or physical environment mapping processes (e.g., system processes and/or application processes) may utilize images (e.g., image frames) captured by one or more image sensors of the cameras 150 and/or the sensors 152.

In some examples, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 and/or providing power to the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an example, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner, such as a host environment for a group session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload. The electronic device 105 may be, and/or may include all or part of, the electronic system discussed below with respect to FIG. 8.

The network 106 may communicatively (directly or indirectly) couple, for example, the electronic device 105, the electronic device 110, and/or the electronic device 115 with each other device and/or the server 120. In some examples, the network 106 may be an interconnected network of devices that may include, or may be communicatively coupled to, the Internet.

The handheld electronic device 104 may be, for example, a smartphone, a portable computing device such as a laptop computer, a companion device (e.g., a digital camera, headphones), a tablet device, a wearable device such as a watch, a band, and the like, or any other appropriate device that includes, for example, one or more speakers, communications circuitry, processing circuitry, memory, a touchscreen, and/or a touchpad. In some examples, the handheld electronic device 104 may not include a touchscreen but may support touchscreen-like gestures, such as in an extended reality environment. In some examples, the handheld electronic device 104 may include a touchpad. In FIG. 1, by way of example, the handheld electronic device 104 is depicted as a tablet device.

The electronic device 110 may be, for example, a smartphone, a portable computing device such as a laptop computer, a companion device (e.g., a digital camera, headphones), a tablet device, a wearable device such as a watch, a band, and the like, or any other appropriate device that includes, for example, one or more speakers, communications circuitry, processing circuitry, memory, a touchscreen, and/or a touchpad. In some examples, the electronic device 110 may not include a touchscreen but may support touchscreen-like gestures, such as in an extended reality environment. In some examples, the electronic device 110 may include a touchpad. In FIG. 1, by way of example, the electronic device 110 is depicted as a tablet device. In some examples, the electronic device 110, the handheld electronic device 104, and/or the electronic device 105 may be, and/or may include all or part of, the electronic system discussed below with respect to FIG. 7. In some examples, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer having one or more cameras 150 (e.g., multiple cameras 150). The electronic device 115 may be, and/or may include all or part of, the electronic system discussed below with respect to FIG. 7.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an example, the server 120 may function as a cloud storage server that stores any of the aforementioned extended reality content generated by the above-discussed devices and/or the server 120.

Figure 2:
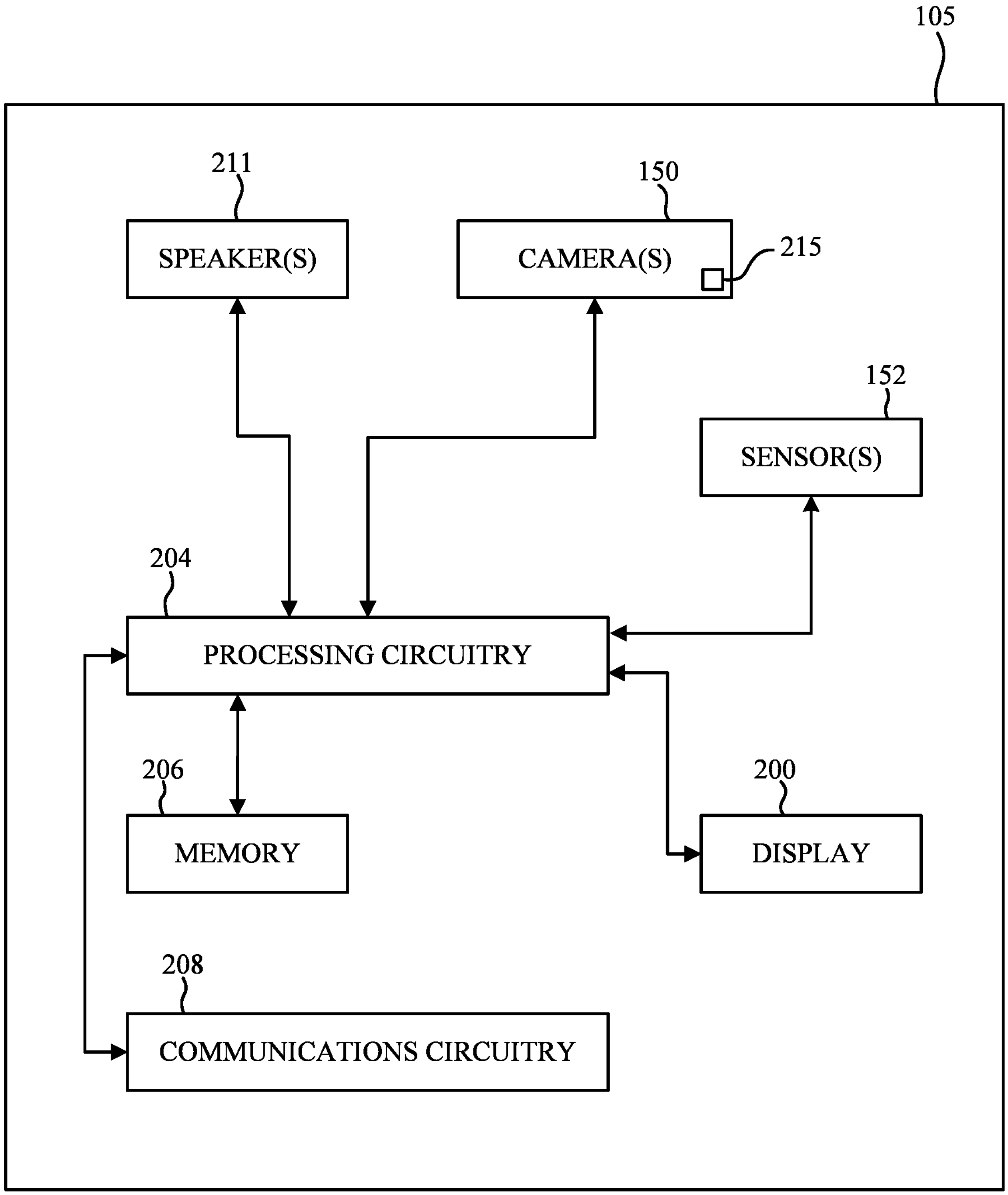
FIG. 2 illustrates a block diagram of example features of an electronic device in accordance with some examples.

FIG. 2 illustrates a block diagram of various components that may be included in electronic device 105, in accordance with aspects of the disclosure. As shown in FIG. 2, electronic device 105 may include one or more cameras such as camera(s) 150 (e.g., multiple cameras 150, each including one or more image sensors 215) that capture images and/or video of the physical environment around the electronic device, one or more sensors 152 that obtain environment information (e.g., depth information) associated with the physical environment around the electronic device 105. Sensors 152 may include depth sensors (e.g., time-of-flight sensors, infrared sensors, radar, sonar, lidar, etc.), one or more microphones, and/or other types of sensors for sensing the physical environment. For example, one or more microphones included in the sensor(s) 152 may be operable to capture audio input from a user of the electronic device 105, such as a voice input corresponding to the user speaking into the microphones. In the example of FIG. 2, electronic device 105 also includes communications circuitry 208 for communication with electronic device 110, electronic device 115, servers 120, and/or other devices and/or systems in some examples. Communications circuitry 208 may include radio frequency (RF) communications circuitry for detecting radio frequency identification (RFID) tags, Bluetooth Low Energy (BLE) communications circuitry, other near-field communications (NFC) circuitry, WiFi communications circuitry, cellular communications circuitry, and/or other wired and/or wireless communications circuitry.

As shown, electronic device 105 includes processing circuitry 204 (e.g., one or more processors and/or integrated circuits) and memory 206. Memory 206 may store (e.g., temporarily or permanently) content generated by and/or otherwise obtained by electronic device 105. In some operational scenarios, memory 206 may temporarily store images of a physical environment captured by camera(s) 150, depth information corresponding to the images generated, for example, using a depth sensor of sensors 152, meshes and/or textures corresponding to the physical environment, virtual objects such as virtual objects generated by processing circuitry 204 to include virtual content, and/or virtual depth information for the virtual objects. Memory 206 may store (e.g., temporarily or permanently) intermediate images and/or information generated by processing circuitry 204 for combining the image(s) of the physical environment and the virtual objects and/or virtual image(s) to form, e.g., composite images for display by display 200, such as by compositing one or more virtual objects onto a pass-through video stream obtained from one or more of the cameras 150.

As shown, the electronic device 105 may include one or more speakers 211. The speakers may be operable to output audio content, including audio content stored and/or generated at the electronic device 105, and/or audio content received from a remote device or server via the communications circuitry 208.

Memory 206 may store instructions or code for execution by processing circuitry 204, such as, for example operating system code corresponding to an operating system installed on the electronic device 105, and application code corresponding to one or more applications installed on the electronic device 105. The operating system code and/or the application code, when executed, may correspond to one or more operating system level processes and/or application level processes, such as processes that support capture of images, obtaining and/or processing environmental condition information, and/or determination of inputs to the electronic device 105 and/or outputs (e.g., display content on display 200) from the electronic device 105.

In some examples, one or more input devices include one or more camera sensors (e.g., one or more optical sensors and/or one or more depth camera sensors such as for tracking a user's gestures (e.g., hand gestures and/or air gestures) as input. In some examples, the one or more input devices are integrated with the computer system. In some examples, the one or more input devices are separate from the computer system. In some examples, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

Attention is now directed towards techniques for managing three-dimensional environments. Such techniques are described in the context of a computer system executing a 3D framework and a separate 2D framework. It should be recognized that other configurations can be used with techniques described herein. For example, the 3D framework and/or the 2D frame can execute on a separate device using techniques described herein. In addition, techniques optionally complement or replace other techniques for managing three-dimensional environments.

Figure 3:
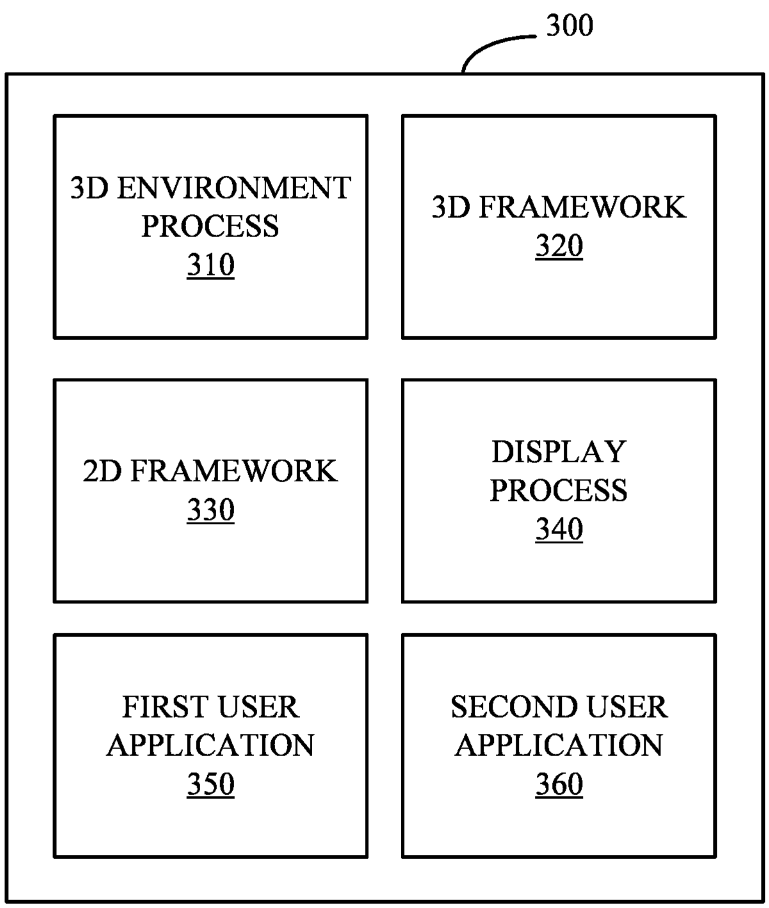
FIG. 3 is a block diagram illustrating a computer system in accordance with some examples.

FIG. 3 is a block diagram illustrating a computer system (e.g., computer system 300) in accordance with some examples. Not all of the illustrated components are used in all examples; however, one or more examples can include additional and/or different components than those shown in FIG. 3. In some examples, computer system 300 includes one or more components described above with respect to electronic device 105, handheld electronic device 104, electronic device 110, electronic device 115, and/or server 120 as shown in FIG. 1. Variations in the arrangement and type of the components can be made without departing from the spirit or scope of the claims as set forth herein. Additional components, different components, and/or fewer components can be used as well.

In some examples, computer system 300 loads, renders, manages, and/or displays computer-generated content in a 3D environment. The 3D environment can be either virtual or physical, with the computer-generated content either completely covering a field of view of a user or supplementing the field of view. For example, computer system 300 can cause a virtual environment to be rendered and displayed to a user such that the user is provided content that is reactive to movements of the user. When the user moves around and/or performs different gestures, computer system 300 detects and processes the actions (e.g., movements and/or gestures of the user) to provide tailored information to applications executing on computer system 300.

As illustrated in FIG. 3, computer system 300 includes 3D environment process 310, 3D framework 320 (e.g., a 3D UI framework and/or other type of 3D framework), 2D framework 330 (e.g., a 2D UI framework and/or other type of 2D framework), display process 340, first user application 350, and second user application 360. While FIG. 3 illustrates that each of these components are on a single computer system, it should be recognized that one or more components can be on another computer system in communication (e.g., wired and/or wireless communication) with computer system 300. In addition, while each component will be discussed separately, in some examples, the functionality of one or more components are combined together or separated further. In some examples, one or more components of computer system 300 communicate with other components via application programming interfaces (APIs), inter-process communications (IPCs), and/or serial peripheral interfaces (SPIs).

In some examples, 3D environment process 310 executes as a background process (e.g., a daemon, a service, a system process, an application process, and/or one or more instructions) to manage a 3D environment on behalf of one or more applications (e.g., first user application 350 and/or second user application 360). For example, 3D environment process 310 can create the 3D environment, manage a state of the 3D environment, receive requests from the one or more applications to render content in the 3D environment, communicate with 3D framework 320 and/or 2D framework 330 to service the requests, cause display process 340 to display the 3D environment, and/or detect and process inputs from a number of different sources.

In some examples, 3D environment process 310 provides one or more APIs to be used by the one or more applications for setting up the 3D environment. In such examples, the APIs can work in a declarative form that allows for developers to create views, animations, and/or other user-interface elements without needing to configure the 3D environment imperatively. In some examples, 3D environment process 310 creates a scene via a scene graph, adds one or more entities to the scene, and/or causes the scene to be rendered.

In some examples, 3D environment process 310 combines functionality of 3D framework 320 and 2D framework 330 such that user-interface elements and/or functionality provided by 3D framework 320 and/or 2D framework 330 can be used with each other rather than requiring one or the other to be used at a time. For example, 3D environment process 310 acts as a bridge between 3D framework 320 and 2D framework 330, providing each the ability to render objects together in a single scene. In some examples, 3D framework 320 renders 3D objects (e.g., via a first render server) and manages interactions with respect to the 3D objects and/or other objects. Similarly, 2D framework renders 2D objects (e.g., via a second render server different from the first render server) (e.g., and not 3D objects) and manages interactions with respect to the 2D objects and/or other objects. Rather than requiring each framework to work independently, such as providing a separate space for each to own, techniques described herein provide a single space that combines functionality of 3D framework 320 and 2D framework 330 to create the 3D environment. For example, as further discussed below, 2D environment can render objects to be used by 3D framework 320 when rendering the 3D environment.

In some examples, to perform such functionality described above, 3D environment process 310 creates a view (e.g., sometimes referred to as a world view) of a 3D environment and adds one or more 3D objects to the view. In such examples, an object of the one or more objects can be hidden, as described further below. In some examples, the object can be used by 3D framework 320 to maintain a place for 2D content from 2D framework 330. In such examples, one technique for implementing such is via a scene graph. The scene graph can include multiple 3D entities that are managed by environment process 310 and/or 3D framework 320. Such 3D entities can include both visible entities and hidden entities. In some examples, a hidden entity (e.g., sometimes referred to as an invisible and/or non-displayed entity) has a size, position, and/or orientation within the 3D environment. Moreover, the hidden entity is connected to a 2D entity such that 3D framework 320 communicates with 2D framework via the hidden entity and/or vice versa.

Figure 4:
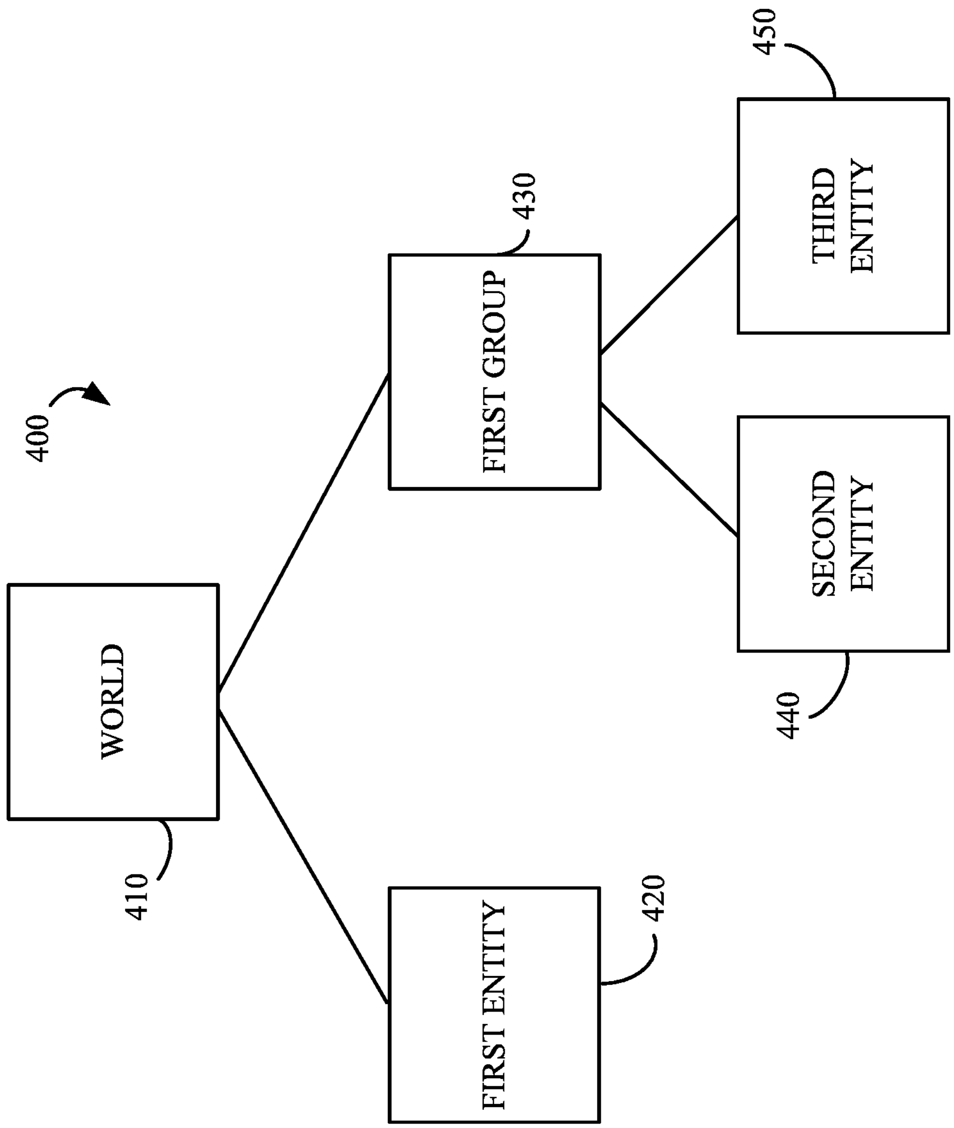
FIG. 4 is a block diagram of a scene graph in accordance with some examples.

FIG. 4 is a block diagram of a scene graph (e.g., scene graph 400) in accordance with some examples. It should be recognized that the block diagram is not meant to be limiting and that such is used for discussion purposes. In some examples, scene graph 400 is a topological representation of a scene, with logical entities as nodes. In such examples, scene graph 400 can encode entities, their relationships, and operations required to render content. For example, world 410 of scene graph 400 can be a root node of scene graph 400 and include one or more render operations for the 3D environment.

From world 410, scene graph 400 can include one or more branch and/or leaf nodes that correspond to entities in the 3D environment and their respective rendering operations. For example, first entity 420 can correspond to visible content in the 3D environment and include operations to be performed to render the visible content. Such operations can include a position and/or orientation of the visible content along with textures to be used for the rendering process of the visible content. In some examples, the rendering process for the visible content is performed by 3D framework 320 via one or more APIs between 3D environment process 310 and 3D framework 320. Such operations can be performed without the use of 2D framework 330 as the visible content does not include any content rendered and/or managed by 2D framework 330.

In addition to first entity 420, scene graph 400 also includes first group 430 as a branch node of world 410. In some examples, first group 430 represents multiple entities that are related to each other. For example, second entity 440 can be a leaf node of first group 430 and represent more visible content that is rendered via 3D framework 320 without the use of 2D framework 330. In some examples, third entity 450 is another leaf node of first group 430. Third entity 450 can be a hidden entity that does not directly correspond to visible content. For example, third entity 450 might not by itself include any visible user-interface elements. Instead, third entity 450 can be a proxy for a 2D entity that is managed by 2D framework 330.

In some examples, the 2D entity includes information related to content rendered via 2D framework 330 (sometimes referred to as 2D content and/or 2D rendered content herein) and communicates such information and/or rendered texture to third entity 450 for use by 3D framework 320 when rendering. For example, a respective application (e.g., first user application 350 and/or second user application 360) can send a request to 3D environment process 310 to add a 2D object to the 3D environment. In response to the request, 3D environment process 310 can add a 3D object to a scene graph for the 3D environment, the 3D object is not visible in the 3D environment and is intended to hold a location and/or orientation for 2D content. In some examples, the 3D object can have a size corresponding to a size of the 2D content and be located at a position and/or an orientation requested by the respective application. In such examples, the 3D object can also include a mesh (e.g., a 3D mesh) that is used by 3D framework 320 when adding 2D rendered content. For example, 2D content is rendered by 2D framework 330 and placed on the 3D mesh by 3D framework 320 so that rendering the 3D environment by 3D framework 320 includes rendering the 2D rendered content within the 3D environment.

In some examples, third entity 450 is used to inform 3D framework 320 when to update. For example, 2D framework 330 and/or another process can detect an event that requires an update and, in response, send a request to 3D framework 320 via third entity 450 to update the 3D environment based on information associated with the 2D entity. In some examples, the combination of third entity 450 and the 2D entity allows 2D framework 330 to communicate with 3D framework 320, whereas typically the two frameworks would be completely independent.

In some examples, third entity 450 is attached to and/or configured relative to another 3D entity (e.g., second entity 440). In such examples, third entity 450 can ensure that a position and/or orientation of third entity 450 stays consistent with and/or maintains relative positioning and/or orientation with second entity 440 so that rendered content received by the 2D entity can move with second entity 440 without the 2D entity and/or 2D framework 330 needing to track where second entity 440 is located.

In some examples, third entity 450 includes information such as transformations (e.g., rotating, shrinking, enlarging, stretching, modifying a shape, and/or modifying a color characteristic) to be performed to content received from the 2D entity, collision dynamics to indicate how third entity 450 (and, by consequence to the 2D content tracking location and/or orientation of third entity 450, the 2D content) reacts to collisions with other 3D objects in the 3D environment, and/or physics dynamics to indicate how physics affects position and/or orientation of third entity 450 (and, by consequence to the 2D content tracking location and/or orientation of third entity 450, the 2D content) within the 3D environment.

While the above discussion is with respect to a single 3D environment, it should be recognized that 3D environment process 310 can manage multiple different environments (e.g., serially and/or simultaneously) and that different environments can include overlapping visible and/or hidden entities.

Figure 5:
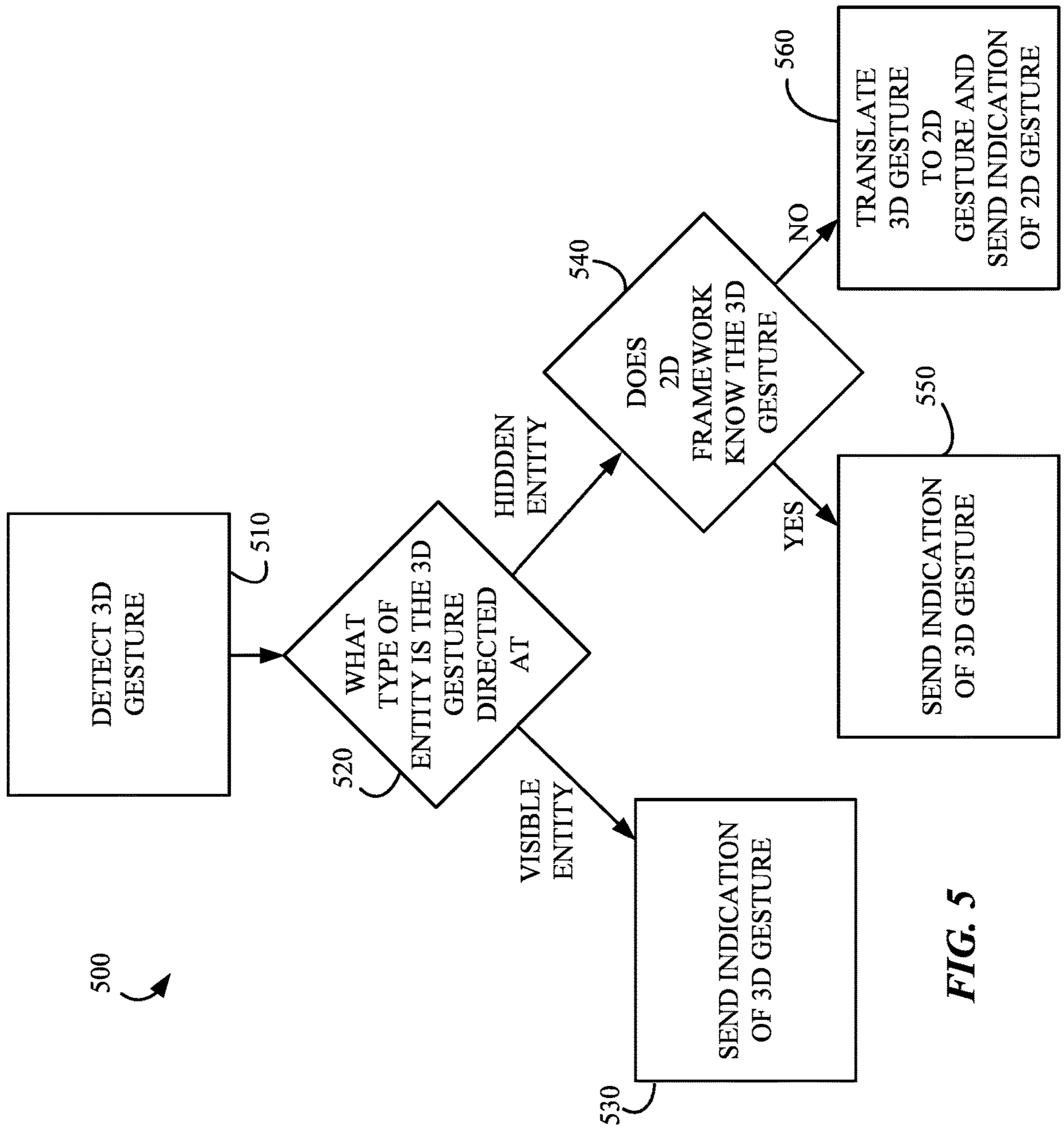
FIG. 5 is a block diagram illustrating a process for processing gestures in a 3D environment according to some examples.

FIG. 5 is a block diagram illustrating a process (e.g., process 500) for processing gestures in a 3D environment according to some examples. Some operations in process 500 are, optionally, combined, the orders of some operations are, optionally, changed, and some operations are, optionally, omitted.

In some examples, process 500 is performed by a process (e.g., a system process or an application process) executing on a computer system, such as 3D environment process 310 described above. In such examples, the process can detect a 3D gesture and conditionally translate the 3D gestures into a 2D gesture.

Process 500 begins at 510, where the process detects a first 3D gesture. In some examples, the first 3D gesture includes 6 degrees of freedom, such as an x, y, and z value. For example, the first 3D gesture can correspond to movement of a user (e.g., a hand, an eye, and/or a leg) and be captured via one or more cameras in communication with the computer system. Other examples of input devices that can be used include a camera, a motion sensor, a depth sensor, a remote control, a gyroscope, an accelerometer, a touch-sensitive surface, and/or a physical input mechanism (e.g., a keyboard, a mouse, a rotatable input mechanism, and/or a physical button).

At 520, in response to detecting the first 3D gesture, the process determines which entity in a 3D environment (e.g., a virtual or a physical 3D environment) that the first 3D gesture is directed to. In some examples, the entity is determined using a scene graph (e.g., scene graph 400 of FIG. 4). For example, the process can determine that the first 3D gesture is directed to a particular location within the 3D environment and, based on the particular location and the scene graph, determines that the first 3D gesture is directed to a particular entity in the scene graph. In some examples, the particular entity is a visible entity (e.g., content that corresponds to a 3D framework (e.g., 3D framework 320) and not a 2D framework (e.g., 2D framework 330)). In other examples, the particular entity is a hidden entity (e.g., content that corresponds to the 2D framework and not the 3D framework).

At 530, in response to determining that the first 3D gesture is directed to a visible entity in the scene graph, the first process sends an indication of the first 3D gesture to the 3D framework and/or an application (e.g., a user application executing on the computer system, such as first user application 350 and/or second user application 360) corresponding to the visible entity. In some examples, the indication of the first 3D gesture is sent to the application corresponding to the visible entity via the 3D framework. In some examples, the indication of the first 3D gesture includes and/or is an indication of a type of gesture and does not specify one or more locations and/or orientations of an input that is detected (e.g., the indication is not at the level of joints and positions of fingers but rather at the level of communicating a category).

At 540, in response to determining that the first 3D gesture is directed to a hidden entity in the scene graph, the first process determines whether the 2D framework is aware of a type of gesture corresponding to the first 3D gesture. For example, the 2D framework can be configured to recognize some types of 3D gestures and/or some 3D gestures are not specific to a 3D coordinate space and therefore do not need to be translated to a type of 2D gesture.

At 550, in response to determining that the 2D framework is aware of a type of gesture corresponding to the first 3D gesture, the first process sends the indication of the first 3D gesture to the 2D framework and/or an application (e.g., a user application executing on the computer system, such as first user application 350 and/or second user application 360) corresponding to the hidden entity. In some examples, the indication of the first 3D gesture is sent to the application corresponding to the hidden entity via the 2D framework. In some examples, the indication of the first 3D gesture includes and/or is an indication of a type of gesture and does not specify one or more locations and/or orientations of an input that is detected (e.g., the indication is not at the level of joints and positions of fingers but rather at the level of communicating a category).

At 560, in response to determining that the 2D framework is not aware of a type of gesture corresponding to the first 3D gesture, the first process translates the first 3D gesture into a first 2D gesture (e.g., a gesture that is a type of 2D gesture) and sends an indication of the first 2D gesture to the 2D framework and/or the application corresponding to the hidden entity. In some examples, translating the first 3D gesture includes identifying a 2D gesture corresponding to the first 3D gesture. In some examples, translating the first 3D gesture includes removing data from the first 3D gesture to create the first 2D gesture. In some examples, translating the first 3D gesture includes removing an axis (e.g., removing z axis from x, y, and z) and/or reducing from 6 degrees of freedom to 2 degrees of freedom. It should be recognized that the examples for translating the first 3D gesture described above are not an exhaustive list and that some examples can be combined with others. In some examples, the indication of the first 2D gesture is sent to the application corresponding to the hidden entity via the 2D framework. In some examples, the indication of the first 2D gesture includes and/or is an indication of a type of gesture and does not specify one or more locations and/or orientations of an input that is detected (e.g., the indication is not at the level of joints and positions of fingers but rather at the level of communicating a category).

In some examples, an indication that is sent can correspond to a first type of coordinate space (e.g., a world space (e.g., a specific location in the 3D environment) and/or a user space (e.g., a location corresponding to a field of view of the computer system)). In such examples, after sending an indication of a respective gesture, the process receives, from an application, a request for a second type of coordinate space different from the first type of coordinate space. In response to the request for the second type of coordinate space, first process can convert the indication that was sent to a different coordinate space and send the converted indication to the application. In other examples, before the first 3D gesture is detected, the application defines a type of coordinate space for the process to use when communicating with the computer system.

In some examples, an indication that is sent can correspond to a first type of unit (e.g., a type of measurement). In such examples, after sending an indication of a respective gesture, the process receives, from an application, a request for a second type of unit different from the first type of unit. In response to the request for the second type of unit, first process can convert the indication that was sent to the second type of unit and send the converted indication to the application. In other examples, before the first 3D gesture is detected, the application defines a type of unit for the process to use when communicating with the computer system.

While the discussion above is with respect to translating from a 3D gesture to a 2D gesture, it should be recognized that techniques described herein can be used for translating from a 2D gesture to a 3D gesture depending on a destination. For example, a 2D gesture can be detected and, in accordance with a determination that the 2D gesture is being sent to a component requesting and/or needing a 3D gesture, the first process can translate the 2D gesture to a first 3D gesture using the opposite of one or more of the techniques described above with respect to translating from a 3D gesture to a 2D gesture. In some examples, translation from a 2D gesture to a 3D gesture can be used in the context of a 2D window and/or application providing the first process a first 2D gesture and needing a 3D gesture corresponding to the first 2D gesture so that the application can send the 3D gesture to a 3D framework.

Figure 6:
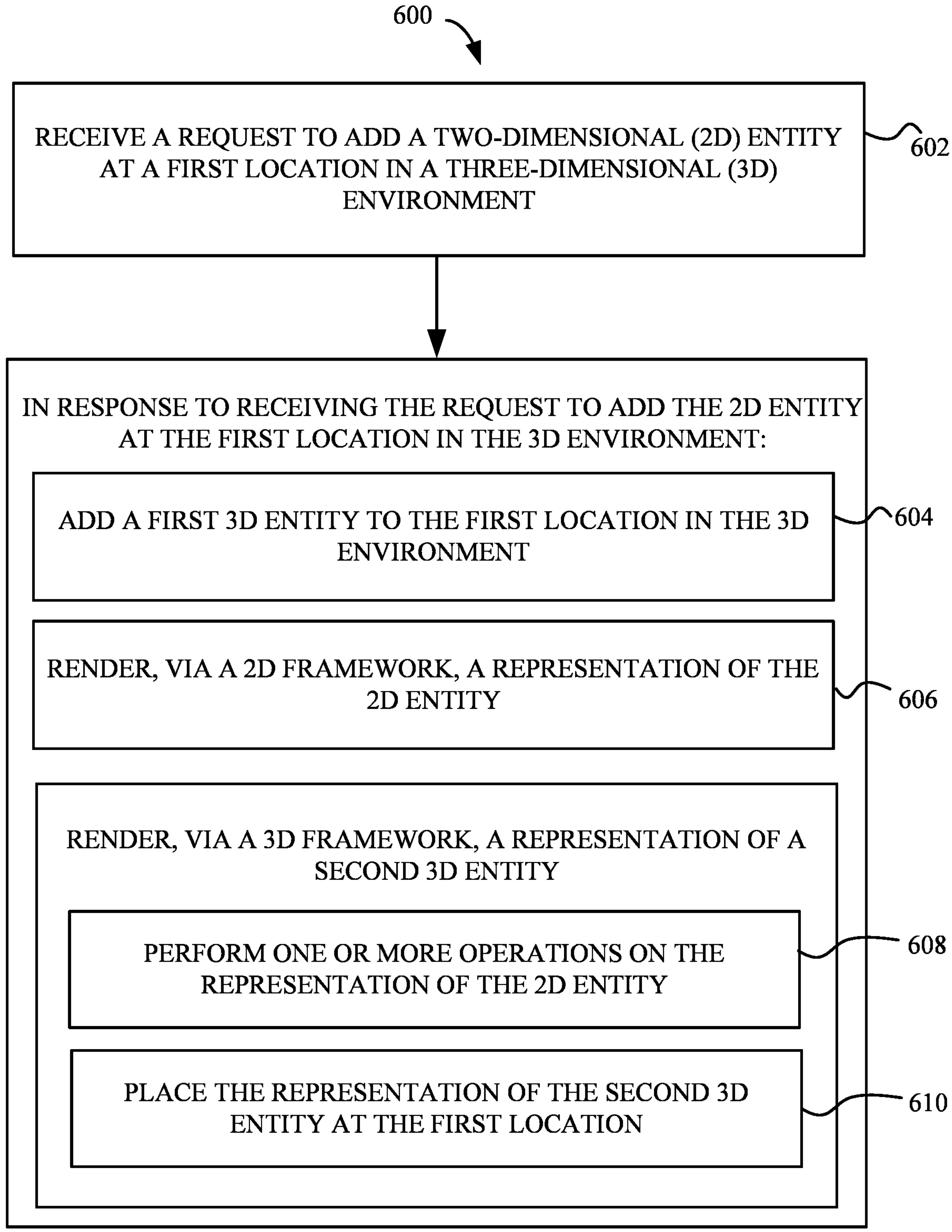
FIG. 6 is a flow diagram illustrating a method for integrating a 2D framework with a 3D framework in accordance with some examples.

FIG. 6 is a flow diagram illustrating a method (e.g., method 600) for integrating a 2D framework with a 3D framework in accordance with some examples. Some operations in method 600 are, optionally, combined, the orders of some operations are, optionally, changed, and some operations are, optionally, omitted. In some examples, method 600 is performed by a computer system (e.g., 300).

At 602, the computer system receives, from an application (e.g., 340 and/or 350) (e.g., a user application and/or an application installed on the computer system (e.g., by a user and/or another computer system)) (e.g., of the computer system (e.g., a device, a personal device, a user device, and/or a head-mounted display (HMD))), a request to add (e.g., display, configure, and/or place) a two-dimensional (2D) entity (e.g., the 2D entity corresponding to 450) (e.g., a 2D object, a 2D model, a 2D user interface, a 2D window, and/or a 2D user interface element) at a first location in a three-dimensional (3D) environment (e.g., a virtual reality environment, a mixed reality environment, and/or an augmented reality environment), wherein the 3D environment includes one or more 3D entities (e.g., 420, 440, and/or 450) (e.g., a 3D object, a 3D model, a 3D user interface, a 3D window, and/or a 3D user-interface element). In some examples, the computer system is a phone, a watch, a tablet, a fitness tracking device, a wearable device, a television, a multi-media device, an accessory, a speaker, and/or a personal computing device. In some examples, the computer system is in communication with input/output devices, such as one or more cameras (e.g., a telephoto camera, a wide-angle camera, and/or an ultra-wide-angle camera), speakers, microphones, sensors (e.g., heart rate sensor, monitors, antennas (e.g., using Bluetooth and/or Wi-Fi), fitness tracking devices (e.g., a smart watch and/or a smart ring), and/or near-field communication sensors). In some examples, the computer system is in communication with a display generation component (e.g., a projector, a display, a display screen, a touch-sensitive display, and/or a transparent display). In some examples, receiving the request to add the 2D entity at the first location in the 3D environment includes detecting, via one or more input devices in communication with the computer system, an input (e.g., a tap input and/or a non-tap input, such as an air input (e.g., a pointing air gesture, a tapping air gesture, a swiping air gesture, and/or a moving air gesture), a gaze input, a gaze-and-hold input, a mouse click, a mouse click-and-drag, a key input of a keyboard, a voice command, a selection input, and/or an input that moves the computer system in a particular direction and/or to a particular location). In some examples, one or more operations of method 600 are performed via a process (e.g., 310) of the computer system.

At 604, in response to receiving the request to add the 2D entity at the first location in the 3D environment, the computer system adds a first 3D entity (e.g., 450) (e.g., a hidden or proxy entity) to the first location in the 3D environment. In some examples, adding the first 3D entity does not include displaying the first 3D entity. In some examples, the first 3D entity is not visible in the 3D environment. In some examples, the first 3D entity is different and/or separate from the 2D entity.

At 606, in response to receiving the request to add the 2D entity at the first location in the 3D environment, the computer system renders (e.g., synthesizes, generates, and/or creates), via a 2D framework (e.g., 330) (e.g., of the computer system or in communication with the computer system) (e.g., a 2D user interface framework) (e.g., and not a 3D framework (e.g., 320)) (e.g., software that includes one or more predefined user-interface elements and/or one or more operations to build, generate, render, enable interactions with, and/or display a user interface and/or user interface element in two dimensions (e.g., and not three dimensions)), a representation (e.g., a graphical and/or visual representation) of the 2D entity.

At 608, in response to receiving the request to add the 2D entity at the first location in the 3D environment, the computer system renders, via a 3D framework (e.g., 320) (e.g., of the computer system or in communication with the computer system) (e.g., software that includes one or more predefined user-interface elements and/or one or more operations to build, generate, render, enable interactions with, and/or display a user interface and/or user interface element in three dimensions (e.g., and not two dimensions)), a representation (e.g., a graphical and/or visual representation) of a second 3D entity (e.g., 450) (e.g., different and/or separate from the first 3D entity) by (e.g., rendering the representation of the second 3D entity includes) performing (e.g., via the 3D framework) one or more operations on the representation of the 2D entity. In some examples, the second 3D entity is a visible representation of the first 3D entity. In some examples, the second 3D entity is different and/or separate from the 2D entity.

At 610, in response to receiving the request to add the 2D entity at the first location in the 3D environment, the computer system renders, via the 3D framework, the representation of the second 3D entity by placing (e.g., via the 3D framework) the representation of the second 3D entity at the first location (e.g., at a location corresponding to the first 3D entity). In some examples, after placing the representation of the second 3D entity at the first location, the computer system displays, via a display generation component in communication with the computer system, the 3D environment including display of at least a portion of the representation of the second 3D entity at the first location.

In some examples, an observable (e.g., perceivable, visible, and/or audible) representation (e.g., a visual and/or an auditory representation) of the first 3D entity is not present (e.g., visible, displayed, and/or output) in the 3D environment (e.g., the first 3D entity is used for tracking purposes for the application, the 3D framework, and/or the 2D framework, such as to track position, orientation, and/or pose for the second 3D entity and/or information related to the 2D entity).

In some examples, performing the one or more operations include rotating the representation of the 2D entity, shirking the representation of the 2D entity, enlarging the representation of the 2D entity, stretching the representation of the 2D entity, modifying a shape of the representation of the 2D entity, modifying a color characteristic (e.g., hue, saturation, and/or brightness) of the representation of the 2D entity, or one or more combinations thereof (e.g., based on information (e.g., position, orientation, and/or pose) included in the first 3D entity) (e.g., based on information (e.g., a size and/or a color characteristic) included in the second 2D entity) (e.g., based on information (e.g., a color characteristic and/or a physics setting to augment an appearance of the representation of the 2D entity) corresponding to the 3D environment).

In some examples, the computer system sends, to a display process (e.g., 340) (e.g., of the computer system and/or of a display generation component (e.g., of a head-mounted display (HMD) device) in communication with the computer system) (e.g., a system process or another application different from the application), a request to display a representation of the one or more 3D entities (e.g., the computer system causes the display process to display the representation of the one or more 3D entities). In some examples, the display process is different from the process of the computer system.

In some examples, after placing the representation of the second 3D entity at the first location, the computer system detects movement of a visible representation (e.g., visible within the 3D environment) of a third 3D entity of the one or more 3D entities from a second location to a third location. In some examples, the third location is different from the second location. In some examples, the second location is a first distance from the first location (e.g., zero or more units). In some examples, the third location is different from the first location. In some examples, the visible representation of the third 3D entity is not currently visible as a result of a current orientation of a view area but is visible as a result of another orientation different from the current orientation of the view area. In some examples, in response to detecting the movement of the visible representation of the third 3D entity, the computer system places (e.g., via the 3D framework) the representation of the second 3D entity at a fourth location different from the first location. In some examples, the fourth location is the first distance from the third location (e.g., the representation of the second 3D entity maintains a relative position to the visible representation of the third 3D entity).

In some examples, the computer system receives (e.g., via the 2D framework and/or the application) a change to the 2D entity. In some examples, the change is caused by the application. In some examples, the change is caused by an interaction of the representation of the 2D entity with a representation of a 3D entity in the 3D environment. In some examples, the change is caused by an input (e.g., a tap input and/or a non-tap input, such as an air input (e.g., a pointing air gesture, a tapping air gesture, a swiping air gesture, and/or a moving air gesture), a gaze input, a gaze-and-hold input, a mouse click, a mouse click-and-drag, a key input of a keyboard, a voice command, a selection input, and/or an input that moves the computer system in a particular direction and/or to a particular location) detected via one or more input devices (e.g., a camera (e.g., a telephoto camera, a wide-angle camera, and/or an ultra-wide-angle camera), a microphone, a sensor (such as a heart rate sensor), a touch-sensitive surface, a mouse, a keyboard, a touch pad, and/or an input mechanism (e.g., a physical input mechanism, such as a rotatable input mechanism and/or a button)) in communication with the computer system. In some examples, in response to receiving the change to the 2D entity, the computer system renders, via the 3D framework, a second representation of the 2D entity, wherein the second representation is different from (e.g., a different appearance, location, orientation, and/or pose) the representation of the 2D entity.

In some examples, the computer system detects, via one or more input devices (e.g., a camera (e.g., a telephoto camera, a wide-angle camera, and/or an ultra-wide-angle camera), a microphone, a sensor (such as a heart rate sensor), a touch-sensitive surface, a mouse, a keyboard, a touch pad, and/or an input mechanism (e.g., a physical input mechanism, such as a rotatable input mechanism and/or a button)) (e.g., in communication with the computer system), an input (e.g., a tap input and/or a non-tap input, such as an air input (e.g., a pointing air gesture, a tapping air gesture, a swiping air gesture, and/or a moving air gesture), a gaze input, a gaze-and-hold input, a mouse click, a mouse click-and-drag, a key input of a keyboard, a voice command, a selection input, and/or an input that moves the computer system in a particular direction and/or to a particular location) (e.g., a 3D gesture) directed to the representation of the second 3D entity. In some examples, in response to detecting the input directed to the representation of the second 3D entity and in accordance with a determination that a first set of one or more criteria (e.g., as described below with respect to method 700) is satisfied, the computer system translates the input to a second input (e.g., generating the second input) (e.g., a 2D representation of the input) different from the input (e.g., as described below with respect to method 700). In some examples, the first set of one or more criteria includes a criterion that is satisfied when the input is a first type of input (e.g., as described below with respect to method 700). In some examples, in response to detecting the input directed to the representation of the second 3D entity and in accordance with a determination that a first set of one or more criteria (e.g., as described below with respect to method 700) is satisfied, the computer system sends, to the application (e.g., via the 2D framework), an indication of the second input (e.g., without sending an indication of the input). In some examples, in response to detecting the input directed to the representation of the second 3D entity and in accordance with a determination that a second set of one or more criteria is satisfied (e.g., as described below with respect to method 700), the computer system (and/or the process of the computer system) sends, to the application (e.g., via the 2D framework), an indication of the input (e.g., without sending the indication of the second input). In some examples, the second set of one or more criteria is different from the first set of one or more criteria. In some examples, the second set of one or more criteria includes a criterion that is satisfied when the first set of one or more criteria is not satisfied. In some examples, in response to detecting the input directed to the representation of the second 3D entity and in accordance with a determination that a third set of one or more criteria (e.g., as described below with respect to method 700) is satisfied, the computer system (and/or the process of the computer system) sends, to the application (e.g., via the 2D framework), the indication of the second input and the indication of the input. In some examples, the third set of one or more criteria is different from the first set of one or more criteria and/or the second set of one or more criteria. In some examples, the third set of one or more criteria includes a criterion that is satisfied when the first set of one or more criteria and/or the second set of one or more criteria is not satisfied.

In some examples, the computer system detects an interaction (e.g., a collision and/or an effect of a proximity (e.g., gravity, a pull effect, and/or a push effect)) between the representation of the second 3D entity and a representation of a fourth 3D entity of the one or more 3D entities. In some examples, in response to detecting the interaction, the computer system renders (e.g., synthesizes, generates, and/or creates), via the 2D framework, an updated representation (e.g., a graphical and/or visual representation) of the 2D entity. In some examples, the updated representation of the 2D entity is different from the representation of the 2D entity. In some examples, in response to detecting the interaction, the computer system renders, via the 3D framework, an updated representation (e.g., a graphical and/or visual representation) of the second 3D entity. In some examples, the updated representation of the second 3D entity is different from the representation of the second 3D entity.

In some examples, the computer system receives, from the application, information (e.g., an effect of the 2D entity on one or more other representations in the 3D environment, such as a glow or other outward effect on an area outside of a representation of the 2D entity) corresponding to the 2D entity. In some examples, the information is included in the request to add the 2D entity at the first location in the 3D environment. In some examples, after receiving the request to add the 2D entity at the first location in the 3D environment, the computer system renders (e.g., via the 3D framework) the 3D environment (e.g., renders one or more representations of one or more visible entities in the 3D environment) (e.g., based on the information corresponding to the 2D entity), wherein the information affects rendering a visual representation of a fifth 3D entity in the 3D environment, and wherein the fifth 3D entity does not correspond to the 2D entity. In some examples, the information affects rendering the visual representation of the fifth 3D entity in the 3D environment by causing a color of the fifth 3D entity to be based on a color of the 2D entity.

In some examples, the first 3D entity is added to a graph (e.g., 400) (e.g., a scene graph) of the 3D environment.

In some examples, the first 3D entity is included in a second 3D environment different from the 3D environment. In some examples, the second 3D environment is not displayed concurrently with the 3D environment. In some examples, the second 3D environment is displayed in response to a request to display the second 3D environment (e.g., and not the 3D environment). In some examples, updates to the first 3D entity affects the 3D environment and the second 3D environment.

In some examples, the first 3D entity includes a size (e.g., corresponding to the 2D entity, the first 3D entity, the second 3D entity, and/or the representation of the second 3D entity), a location (e.g., corresponding to the 2D entity, the first 3D entity, the second 3D entity, and/or the representation of the second 3D entity) (e.g., within the 3D environment), an orientation (e.g., corresponding to the 2D entity, the first 3D entity, the second 3D entity, and/or the representation of the second 3D entity) (e.g., within the 3D environment), a pose (e.g., corresponding to the 2D entity, the first 3D entity, the second 3D entity, and/or the representation of the second 3D entity) (e.g., within the 3D environment), or any combination thereof.

In some examples, the computer system receives, from a second application (e.g., 350 and/or 360) (e.g., a user application and/or an application installed on the computer system (e.g., by a user and/or another computer system)) (e.g., of a computer system (e.g., a device, a personal device, a user device, and/or a head-mounted display (HMD))) different from the application, a request to add a sixth 3D entity (e.g., corresponding to another 2D entity and/or not corresponding to another 2D entity) to the 3D environment. In some examples, the second application is not associated with the application. In some examples, the second application is a different type of application than the application. In some examples, after receiving the request to add the sixth 3D entity to the 3D environment, the computer system renders, via the 3D framework, a representation of the sixth 3D entity. In some examples, the computer system causes concurrent display, in the 3D environment, of the representation of the sixth 3D entity and the representation of the third 3D entity.

In some examples, the application causes the one or more 3D entities to be rendered for (and/or displayed in) the 3D environment.

Note that details of the processes described above with respect to method 600 (e.g., FIG. 6) are also applicable in an analogous manner to other methods described herein. For example, method 700 optionally includes one or more of the characteristics of the various methods described above with reference to method 600. For example, the 3D environment of method 700 is the 3D environment of method 600. For brevity, these details are not repeated below.

Figure 7:
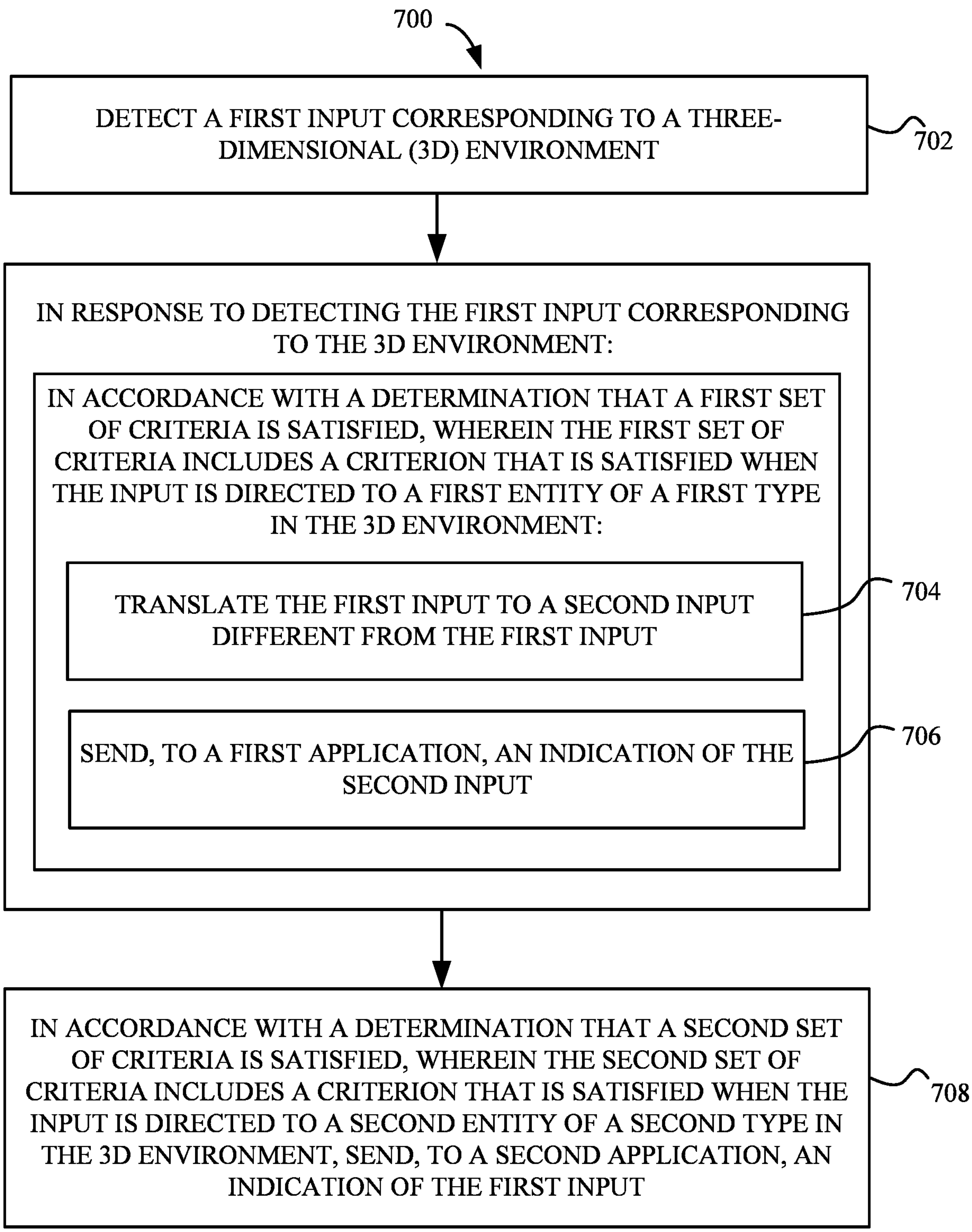
FIG. 7 is a flow diagram illustrating a method for translating between gestures in accordance with some examples.

FIG. 7 is a flow diagram illustrating a method (e.g., method 700) for translating between gestures in accordance with some examples. Some operations in method 700 are, optionally, combined, the orders of some operations are, optionally, changed, and some operations are, optionally, omitted.

In some examples, method 700 is performed at a computer system (e.g., 300) (e.g., a device, a personal device, a user device, and/or a head-mounted display (HMD)) in communication with one or more input devices (e.g., a camera, a touch-sensitive surface, a motion detector, and/or a microphone). In some examples, the computer system is a phone, a watch, a tablet, a fitness tracking device, a wearable device, a television, a multi-media device, an accessory, a speaker, and/or a personal computing device. In some examples, method 700 is performed by a daemon (e.g., 310), a system process (e.g., 310), and/or a user process (e.g., 310, 350, and/or 360).

At 702, the computer system detects, via the one or more input devices, a first input (e.g., 510) (e.g., a tap input and/or a non-tap input, such as an air input (e.g., a pointing air gesture, a tapping air gesture, a swiping air gesture, and/or a moving air gesture), a gaze input, a gaze-and-hold input, a mouse click, a mouse click-and-drag, a key input of a keyboard, a voice command, a selection input, and/or an input that moves the computer system in a particular direction and/or to a particular location) corresponding to a three-dimensional (3D) environment (e.g., a virtual reality environment, a mixed reality environment, and/or an augmented reality environment).

At 704, in response to detecting the first input corresponding to the 3D environment and in accordance with a determination (e.g., 520) that a first set of one or more criteria is satisfied, wherein the first set of one or more criteria includes a criterion that is satisfied when the input is directed to a first entity (e.g., 450) (e.g., an object, a model, a user interface, a window, an element in a scene graph, and/or a user-interface element) of a first type (e.g., a hidden or proxy entity) in the 3D environment, the computer system translates (e.g., 560) the first input to a second input different from the first input. In some examples, the second input is a different format than the first input. In some examples, the second input corresponds to the first input.

At 706, in response to detecting the first input corresponding to the 3D environment and in accordance with a determination that the first set of one or more criteria is satisfied, the computer system sends (e.g., 560), to a first application (e.g., 350 and/or 360) (e.g., a user application and/or an application installed on the computer system (e.g., by a user)) (e.g., of the computer system (e.g., corresponding to the first entity)) (e.g., via a first framework (e.g., 330) (e.g., of the computer system or in communication with the computer system) (e.g., a two-dimensional (2D) framework and/or a 2D user interface framework) (e.g., and not a 3D framework) (e.g., software that includes one or more predefined user-interface elements and/or one or more operations to build, generate, render, enable interactions with, and/or display a user interface and/or user interface element in two dimensions (e.g., and not three dimensions))), an indication of the second input (e.g., without sending an indication of the first input). In some examples, the first application corresponds to the first entity.

At 708, in response to detecting the first input corresponding to the 3D environment and in accordance with a determination that a second set of one or more criteria is satisfied, wherein the second set of one or more criteria includes a criterion that is satisfied when the input is directed to a second entity of a second type (e.g., 420 and/or 440) (e.g., a 3D object, a 3D entity, a 3D model, a 3D user interface, a 3D window, and/or a 3D user-interface element) in the 3D environment, the computer system sends (e.g., 430), to a second application (e.g., of the computer system) (e.g., via a second framework (e.g., 320) different from the first framework (e.g., of the computer system or in communication with the computer system) (e.g., a three-dimensional (3D) framework and/or a 3D user interface framework) (e.g., and not a 2D framework) (e.g., software that includes one or more predefined user-interface elements and/or one or more operations to build, generate, render, enable interactions with, and/or display a user interface and/or user interface element in three dimensions (e.g., and not two dimensions))), an indication of the first input (e.g., without sending the indication of the second input), wherein the second type of entity is different from the first type of entity, and wherein the second set of one or more criteria is different from the first set of one or more criteria. In some examples, the second application corresponds to the second entity. In some examples, a method includes: displaying 2D content; while displaying the 2D content, detecting, via one or more input devices, a 3D gesture directed to the 2D content; in response to detecting the 3D gesture directed to the 2D content, translating the 3D gesture to a 2D gesture and providing the 2D gesture to an application (e.g., via a 2D framework as described above) corresponding to the 2D content (e.g., the application caused display of and/or includes the 2D content).

In some examples, an observable (e.g., perceivable, visible, and/or audible) representation (e.g., a visual and/or an auditory representation) of the first entity of the first type (e.g., a hidden entity corresponding to a 2D entity, as described above with respect to method 600) is not present (e.g., visible, displayed, and/or output) in the 3D environment (e.g., the first entity of the first type is used for tracking purposes for the first application, the 3D framework, and/or the 2D framework, such as to track position, orientation, and/or pose for a representation of an entity related to, corresponding to, and/or associated with the first entity of the first type).

In some examples, an observable (e.g., perceivable, visible, and/or audible) representation (e.g., a visual and/or an auditory representation) of the first entity of the second type (e.g., a visible entity, as described above with respect to method 600) is present (e.g., visible, displayed, and/or output) in the 3D environment.

In some examples, in response to detecting the first input corresponding to the 3D environment and in accordance with a determination that a third set of one or more criteria is satisfied, wherein the third set of one or more criteria includes a criterion that is satisfied when the input is a first type of input (e.g., a type of gesture known by the first application and/or the 2D framework) directed to the first entity of the first type in the 3D environment, the computer system sends (e.g., 550), to the first application (e.g., via the first framework), the indication of the first input (e.g., without translating the first input to the second input), wherein the third set of one or more criteria is different from the first set of one or more criteria and the second set of one or more criteria, and wherein the first set of one or more criteria includes a criterion that is satisfied when the input is a second type of input (e.g., a type of gesture not known by the first application and/or the 2D framework) different from the first type of input.

In some examples, the first input includes a 3D gesture (e.g., a hand pose in three dimensions and/or movement in three dimensions). In some examples, the first input is the 3D gesture.

In some examples, the first input includes an air gesture. In some examples, the first input is the air gesture.

In some examples, the first input includes a gaze of a user directed to a location (e.g., a location corresponding to the first entity and/or the second entity) in the 3D environment. In some examples, the first input is the gaze of the user directed to the location in the 3D environment.

In some examples, in response to detecting the first input corresponding to the 3D environment and in accordance with a determination that a fourth set of one or more criteria is satisfied, wherein the fourth set of one or more criteria includes a criterion that is satisfied when the input is directed to a third entity (e.g., the first entity, the second entity, or another entity different from the first entity and the second entity) of a third type in the 3D environment, the computer system sends, to a fourth application (e.g., via the first framework and/or the second framework), an indication of a location corresponding to a first type of coordinate space for the first input, an orientation corresponding to the first type of coordinate space for the first input, a pose corresponding to the first type of coordinate space for the first input, a magnitude corresponding to the first type of coordinate space for the first input, or any combination thereof, wherein the first type of coordinate space is defined by the fourth application. In some examples, the fourth application is the first application or the second application. In some examples, the indication corresponding to the first type of coordinate space is sent with an indication of an input (e.g., the indication of the first input and/or the indication of the second input). In some examples, the first type of coordinate space is a coordinate space with respect to a window of the fourth application (e.g., application centric, such as a distance from the window) (e.g., and not with respect to a location in the 3D environment other than a location corresponding to the window). In some examples, the indication corresponding to the first type of coordinate space includes an identification of a type of gesture. In response to detecting the first input corresponding to the 3D environment and in accordance with a determination that a fifth set of one or more criteria is satisfied, wherein the fifth set of one or more criteria includes a criterion that is satisfied when the input is directed to a fourth entity of a fourth type in the 3D environment, the computer system sends, to the fourth application (e.g., via the first framework and/or the second framework), an indication of a location corresponding to a second type of coordinate space for the first input, an orientation corresponding to the second type of coordinate space for the first input, a pose corresponding to the second type of coordinate space for the first input, a magnitude corresponding to the second type of coordinate space for the first input, or any combination thereof, wherein the second type of coordinate space is defined by the fourth application, wherein the fifth set of one or more criteria is different from the fourth set of one or more criteria, wherein the fourth type of entity is different from the third type of entity, and wherein the second type of coordinate space is different from the first type of coordinate space (e.g., the indication corresponding to the second type of coordinate space is different from the indication corresponding to the first type of coordinate space). In some examples, the fourth entity is different from the third entity. In some examples, the third type of entity is different from the first type of entity and the second type of entity. In some examples, the fourth type of entity is different from the first type of entity and the second type of entity. In some examples, the indication corresponding to the second type of coordinate space is sent with an indication of an input (e.g., the indication of the first input and/or the indication of the second input). In some examples, the second type of coordinate space is a coordinate space with respect to the 3D environment (e.g., a location within the 3D environment, such as a location of a user, a location of a view point, and/or a location of an object other than the window) (e.g., world centric, such as a distance from a user, and/or world centric, such as a stance from a location in the world) (e.g., and not with respect to a location corresponding to the window). In some examples, the indication corresponding to the first type of coordinate space and the indication corresponding to the second type of coordinate space is sent to the fourth application (e.g., the fourth application is defined to receive indications corresponding to the first type of coordinate space and the second type of coordinate space). In some examples, when the fourth application does not include a definition of a type of coordinate space, the computer system sends, to the fourth application, the indication corresponding to the first type of coordinate space and the indication corresponding to the second type of coordinate space. In some examples, the computer system receives, from the fourth application, a request for an indication for an input corresponding to a particular type of coordinate space. In some examples, in response to receiving the request for the indication for the input corresponding to the particular type of coordinate space, the computer system sends, to the fourth application, the indication for the input corresponding to the particular type of coordinate space. In some examples, the indication corresponding to the second type of coordinate space includes an identification of a type of gesture.

In some examples, the second application is the first application. In some examples, the second application is different from the first application.

In some examples, the second input includes a two-dimensional representation of the first input (e.g., a location, orientation, and/or pose with two or less dimensions).

In some examples, translating the first input to the second input includes modifying a representation of a respective input from having six degrees of freedom to two degrees of freedom.

Note that details of the processes described above with respect to method 700 (e.g., FIG. 7) are also applicable in an analogous manner to the methods described herein. For example, method 600 optionally includes one or more of the characteristics of the various methods described above with reference to method 700. For example, the first entity of the first type of method 700 is the first 3D entity of method 600. For brevity, these details are not repeated below.

In some examples, a view for hosting a 3D framework simulation within a 2D framework view hierarchy is provided. In some examples, the view is defined in a cross-import overlay of a 3D framework (e.g., a 3D UI framework) and a 2D framework (e.g., a 2D UI framework). In some examples, the view can be implemented as a wrapper for a view of the 3D framework. In other examples and/or other types of devices, the view can be implemented as an integration of the 3D framework with the 2D framework via one or more private serial peripheral interfaces (SPIs).

In some examples, the view uses inline closure syntax to bridge between the declarative world of the 2D framework and the imperative world of the 3D framework. In some examples, within these closures, the view provides a mutable 'Content' struct. This struct serves as a container for entities in the view's hierarchy, as well as an entry point to one or more top-level APIs corresponding to the 3D framework.

Here is a simple example of how one could use the view:

```
struct MyCoolSimulation: View {
  @State var state = SimulationState( )
  var body: some View {
    View { content in
      content.add(state.modelEntity)
      // subscribe to scene events, do other setup as needed
    }
  }
}
@Observable
class SimulationState {
  var modelEntity = ModelEntity(mesh: .generateSphere(radius: 0.1))
}
```
```

Handling state updates for the view can be done by adding an 'update' closure, evaluated any time the containing view's body is re-evaluated:
```

```
struct MyCoolSimulation: View {
  @State var state = SimulationState( )
  var showModel: Bool
  var body: some View {
    View { content in
      content.add(state.modelEntity)
    } update: { _ in
      state.modelEntity.isEnabled = showModel
    }
  }
}
```

In some examples, note that the view omits the use of a context or coordinator, as developers can instead use standard constructs corresponding to the 2D framework like '@State' and '@Environment' as needed.

In the prior examples, we generated a simple mesh synchronously for use in our view. In some examples, a developer working with the 3D framework will instead load larger models from disk or a URL, which do not need to be done synchronously on the main actor. In some examples, the view provides a simple convenience for this use case, as its primary 'make' closure is actually 'async':

```
struct MyCoolSimulation: View {
  var body: some View {
    View { content in
      if let robot = try? await ModelEntity(named: "robot") {
        content.add(robot)
      }
    }
  }
}
```

In some examples, until the 'make' closure has completed, the 'view is not considered visible, and a placeholder view is shown instead. In some examples, a developer can customize this placeholder view using the optional 'placeholder' 'ViewBuilder', such as to show a 'ProgressView' spinner. In some examples, a developer can use another instance of the view to display a 3D placeholder model:

```
struct MyCoolSimulation: View {
  @State var state = SimulationState( )
  var body: some View {
    View { content in
      if let robot = try? await ModelEntity(named: "robot") {
        content.add(robot)
      }
    } placeholder: {
      View { content in
        content.add(state.placeholderSphere)
      }
    }
  }
}
```

In some examples, the 'Content' struct provided to the view's closures is a generic type conforming to a protocol. In such examples, the protocol represents the core interface common to some permutations of the view. Concrete types conforming to this protocol can add additional functionality specific to their configuration. For example, an isolated view could provide additional functionality in its 'Content' struct that a shared view would not have access to (more discussion on isolation later).

In some examples, the protocol itself is defined like so:

```
@available(mixedrealityOS, phoneOS, computerOS)
public protocol Protocol {
  associatedtype Entities: EntityCollection
  var entities: Entities { get nonmutating set }
  func subscribe<E: Event>(to event: E.Type,
    on sourceObject: EventSource?,
    componentType: Component.Type?,
    _ handler: @escaping (E) -> Void) -> EventSubscription
}
```

In some examples, processes add and/or remove entities using convenience APIs via the protocol:

```
@available(mixedrealityOS, phoneOS, computerOS)
extension Protocol {
  public func add(_ entity: Entity)
  public func remove(_ entity: Entity)
}
```
```
struct MyCoolSimulation: View {
  var body: some View {
    View { content in
      await addPrimaryContent(to: &content)
      Task { [content] in
        // We can still add this secondary model within the scope of
        // this Task!
        if let secondaryModel = try? await ModelEntity(named: "...") {
          content.add(secondaryModel)
        }
      }
    }
  }
}
```
```
@available(mixedrealityOS, phoneOS, computerOS)
extension Entity.ChildCollection: EntityCollection {
}
```

In some examples, to subscribe to events, like collision events between entities, clients can use the 'subscribe (to: on:componentType:)' method on the protocol, or one of the convenience methods provided in an extension:

```
@available(mixedrealityOS, phoneOS, computerOS)
extension Protocol {
  public func subscribe<E: Event>(to event: E.Type,
    on sourceObject: EventSource? = nil
    _ handler: @escaping (E) -> Void) -> EventSubscription
  public func subscribe<E: Event>(to event: E.Type,
    componentType: Component.Type?,
    _ handler: @escaping (E) -> Void) -> EventSubscription
}
@available(mixedrealityOS, phoneOS, computerOS)
public struct EventSubscription {
  public func cancel( )
}
```

In some examples, 'EventSubscription' is defined in the 3D framework.

In some examples, events published through 'EventSubscription' are scoped only to the entities contained within that view. In some examples, the event subscription will automatically terminate when the 'EventSubscription' is destroyed. In some examples, the event subscription can be terminated early by calling 'EventSubscription.cancel( )'. In some examples, an EventSubscription will automatically cancel the associated event subscription on destruction.

For example, to subscribe to collision events between any two entities in a view:

```
struct JarOfMarbles: View {
  @State var state = SimulationState( )
  @State var subscription: EventSubscription?
  var body: some View {
    View { content in
      let marbles = await state.loadMarbles( )
      content.entities += marbles
      subscription = content.subscribe(to: CollisionEvents.Began.self) {
        state.playMarbleClinkSound(at: collision.position)
      }
    }
  }
}
```

In some examples, the view provides content in a shared scene on mixed reality operating system, and content isolated to a 2D camera projection (AR or non-AR) on a phone operating system and/or a computer operating system. In such examples, these are defined like so:

```
@available(mixedrealityOS)
@available(phoneOS)
@available(computerOS)
public struct Content: Protocol {
  ...
}
@available(phoneOS, computerOS)
public struct Content: Protocol {
  ...
}
```

In some examples, additional APIs can be provided on each type separately. In some examples, to convert coordinates between the 2D framework space and the 3D framework entity space, we introduce new methods on 'Content' for a mixed reality operating system:

```
@available(mixedrealityOS)
extension Content {
  public func convert(
    _ point: SIMD3<Float>, from entity: Entity? = nil,
    to space: CoordinateSpace
  ) -> Point3D
  public func convert(
    _ point: Point3D, from space: CoordinateSpace,
    to entity: Entity? = nil
  ) -> SIMD3<Float>
  public func convert(
    _ rect: BoundingBox, from entity: Entity? = nil,
    to space: CoordinateSpace
  ) -> Rect3D
  public func convert(
    _ rect: Rect3D, from space: CoordinateSpace,
    to entity: Entity? = nil
  ) -> BoundingBox
  public func convert(
    _ transform: AffineTransform3D, from space: CoordinateSpace,
    to entity: Entity? = nil
  ) -> Transform
  public func convert(
    _ transform: Transform, from entity: Entity? = nil,
    to space: CoordinateSpace
  ) -> AffineTransform3D
}
```

In some examples, in this construction, the "to/from" 'CoordinateSpace' represents the 2D framework reference space, while the other is implicitly the local space of the Content. In some examples, the 2D framework space is represented in points, with Y pointing down and a top-left-back origin, while the 3D framework space is represented in meters, with Y pointing up and a center origin. We also use the currency types for each framework ('SIMD3<Float>', 'BoundingBox', and 'Transform' as used in the 3D framework, as opposed to the Spatial types 'Point3D', 'Rect3D', and 'AffineTransform3D' used in the 2D framework).

```
@available(phoneOS, computerOS)
extension Content {
  public func project(
    vector: SIMD3<Float>, to space: CoordinateSpace
  ) -> CGPoint?
  public func unproject(
    point: CGPoint, from space: CoordinateSpace, ontoPlane: float4x4,
    relativeToCamera: Bool = false
  ) -> SIMD3<Float>?
  public func unproject(
    point: CGPoint, viewport: CGRect
  ) -> SIMD3<Float>?
  public func ray(
    through: CGPoint, in space: CoordinateSpace
  ) -> (origin: SIMD3<Float>, direction: SIMD3<Float>)?
  public func entity(
    at point: CGPoint, in space: CoordinateSpace
  ) -> Entity?
  public func entities(
    at point: CGPoint, in space: CoordinateSpace
  ) -> [Entity]
  public func hitTest(
    point: CGPoint, in space: CoordinateSpace,
    query: CollisionCastQueryType, mask: CollisionGroup
  ) -> [CollisionCastHit]
}
```

```
* The physics origin
* The camera mode on a phone operating system (i.e., whether it uses AR)
* The environment (e.g., a skybox)
* The audio listener
* Rendering and debug options
@available(phoneOS, computerOS)
extension Content {
  public typealias DebugOptions = ARView.DebugOptions
  public typealias RenderOptions = ARView.RenderOptions
  public typealias Environment = ARView.Environment
  public var debugOptions: DebugOptions = [ ]
  public var renderOptions: RenderOptions = [ ]
  public var environment: Environment = .default
  public var physicsOrigin: Entity? = nil
  public var audioListener: Entity? = nil
  public struct CameraMode {
    public static var nonAR: CameraMode
    public static var automaticAR: CameraMode
    public static func manualAR(_ sesion: ARSession) -> CameraMode
  }
  public var cameraMode: CameraMode = .automaticAR
}
```

In some examples, the view is designed to provide processes with the option of *isolation*: that is, whether its entities should operate in an independent simulation from any other entities in the application. For example, suppose a developer created two views in a scene of their app. If those views were both isolated, they would each run their own independent set of systems, so behaviors like physics collisions would never occur between entities in different view hierarchies. If those views were *not* isolated, however, they would both share a common set of systems, and thus behaviors like physics collisions could span entities across both views. In some examples, an isolated view would likely create its own Scene, while a non-isolated view would exist within a shared Scene.

In some examples, a flexible container view of the view with a frame can be explicitly set in the same way as any other view. In some examples, clients that wish to size a view to match the size of a containing entity can do so by manually calculating the bounding box of that entity and setting that as the view's frame, like so:

```
struct CustomModel: View {
   @State var modelSize: Size3D?
   var body: some View {
      View { content in
         if let model = try? await ModelEntity("airplane") {
            content.add(model)
            let bounds = model.visualBounds(relativeTo: nil)
            modelSize = content.convert(bounds, to: .local).size
         }
      }.frame(width: modelSize?.width, height: modelSize?.height)
   }
}
```

/// A view for displaying 3D framework content.

///

/// Use a view to display rich 3D content using the 3D framework in your app.

/// A view passes a struct conforming to a protocol

/// to the 'make' and 'update' closures, which you can use to add and remove

/// 3D framework entities to your view.

///

/// Here is a simple example showing how you can display a custom

/// "ModelEntity" using view:

///

```
///     struct ModelExample: View {
///        var body: some View {
///           View { content in
///              if let robot = try? await ModelEntity(named: "robot") {
///                 content.add(robot)
///              }
///              Task {
///                 // perform any additional async work to configure
///                 // the content after the view is rendered
///              }
///           }
///        }
///     }
///
```

/// Note that the closure used in the example above is 'async', and can be used

/// to load contents from your app's bundle or from any "URL" in the background.

/// While your content is loading, view will automatically display a

/// placeholder view, which you can customize using the optional 'placeholder'

/// parameter. It is strongly recommended to load your content asynchronously to /// avoid introducing a hang in your app.

///

/// You can also use the optional 'update' closure on your view to

/// update your 3D framework content in response to changes in your view's state.

/// On a mixed reality operating system, view displays your 3D framework content inline in true 3D /// space, occupying the available space in your app's 3D bounds. This is /// represented by the content type. On a phone operating system, /// view displays its content in an AR camera view by default, and can /// display in a "non-AR" mode when requested or when AR or the device's camera /// is unavailable. On a computer operating system, a view always displays its content in a /// non-AR mode. On both a phone operating system and a computer operating system, this is represented by the /// content type.

///

/// View has a flexible size by default, and does not size itself based

/// on the 3D framework content it is displaying.

///

/// For more advanced uses of a 3D framework, such as subscribing to 3D framework /// events, performing coordinate conversions, or working with AR capabilities, /// refer to the Protocol types.

@available (mixedrealityOS, phoneOS, computerOS)

public struct View<Content: View>: View { }

@available (mixedrealityOS)

extension View {

/// Creates a View.

///

///—Parameters:

///—'make': A closure that you can use to set up and configure the

/// initial content in your view. This closure is 'async' to

/// provide a natural place to load any initial state required to

/// display your view, like a 'ModelEntity' loaded from disk.

/// It is strongly recommended to perform all loading operations

/// asynchronously to avoid creating a hang in your app's UI. While

/// your 'make' closure is still evaluating, the 'placeholder' view

/// will be displayed instead.

///—'update': An optional closure that you can use to update your

/// View's content in response to changes in your view's

/// state.

///—'placeholder': A view to display while your View's 'make'

/// closure is being evaluated. For example, you could use a

/// 'Progress View' as a loading indicator.

```
public init<P: View>(
   make: @Sendable @escaping @MainActor
      (inout Content) async -> Void,
   update: (@MainActor (inout Content) -> Void)? = nil,
   @ViewBuilder placeholder: ( ) -> P
) where Content == Content.Body<P>
```

/// Creates a view.

///

///—Parameters:

///—'make': A closure that you can use to set up and configure the

/// initial content in your 'view. This closure is 'async' to

/// provide a natural place to load any initial state required to

/// display your view, like a 'ModelEntity' loaded from disk.

/// It is strongly recommended to perform all loading operations

/// asynchronously to avoid creating a hang in your app's UI. While

/// your 'make' closure is still evaluating, a system-defined

/// placeholder view is displayed instead.

/// —'update': An optional closure that you can use to update your

/// View's content in response to changes in your view's

/// state.

```
public init(
   make: @Sendable @escaping @MainActor
      (inout Content) async -> Void,
   update: (@MainActor (inout Content) -> Void)? = nil
) where Content == Content.Body<DefaultPlaceholder>
public typealias DefaultPlaceholder = Placeholder
}
```

/// A view that represents the default placeholder for a view.

///

/// You don't create this type directly. "View" creates values for you.

@available (phoneOS

@available (computerOS)

@available (mixedrealityOS)

public struct Placeholder: View { }

@available (phoneOS

@available (computerOS)

extension View {

/// Creates a View.

///

///—Parameters:

///—'make': A closure that you can use to set up and configure the

/// initial content in your view. This closure is 'async' to

/// provide a natural place to load any initial state required to

/// display your view, like a 'ModelEntity' loaded from disk.

/// It is strongly recommended to perform all loading operations

/// asynchronously to avoid creating a hang in your app's UI. While

/// your 'make' closure is still evaluating, the 'place-holder' view

/// will be displayed instead.

/// —'update': An optional closure that you can use to update your

/// View's content in response to changes in your view's

/// state.

///—'placeholder': A view to display while your View's 'make'

/// closure is being evaluated. For example, you could use a

/// 'Progress View' as a loading indicator.

```
public init<P: View>(
   make: @Sendable @escaping @MainActor
      (inout Content) async -> Void,
   update: (@MainActor (inout Content) -> Void)? = nil,
   @ViewBuilder placeholder: ( ) -> P
) where Content == Content.Body<P>
```

/// Creates a view.

///

///—Parameters:

/// —'make': A closure that you can use to set up and configure the

/// initial content in your view. This closure is 'async' to

/// provide a natural place to load any initial state required to

/// display your view, like a 'ModelEntity' loaded from disk.

/// It is strongly recommended to perform all loading operations

/// asynchronously to avoid creating a hang in your app's UI. While

/// your 'make' closure is still evaluating, a system-defined

/// placeholder view is displayed instead.

///—'update': An optional closure that you can use to update your

/// 'View's content in response to changes in your view's

/// state.

```
public init(
   make: @Sendable @escaping @MainActor
      (inout Content) async -> Void,
   update: (@MainActor (inout Content) -> Void)? = nil
   ) where Content == Content.Body<DefaultPlaceholder>
   public typealias DefaultPlaceholder = Placeholder
}
```

/// Represents a subscription to a 3D framework events, and provides the ability /// to cancel that subscription.

@available (mixedrealityOS, phoneOS, computerOS)

public struct EventSubscription {

/// Cancels the subscription to events.

/// This method can be used to cancel the subscription before destruction.

public func cancel( )

}

@available (mixedrealityOS, phoneOS, computerOS)

/// An ordered, mutable collection of "Entity"s public protocol EntityCollection: Collection where Element==Entity, Index==Int {

/// Adds the specified entity to the end of this collection.

///

///—Parameters:

///—entity: The entity to add to the collection.

mutating func append (_entity: Entity)

/// Adds the specified sequence of entities to the end of this collection,

/// in order.

///

///—Parameters:

///—sequence: The entities to add to the collection.

mutating func append<S> (contentsOf sequence: S) where S: Sequence, S.Element: Entity /// Adds the specified entity to this collection directly before the entity /// at the given index. If the entity is already located before the index,
/// the collection will not change.
///—Parameters:
///—entity: The entity to add to the collection.
///—index: The index of an entity to insert in front
/// of. If 'endIndex' is provided, the entity
will be appended.
mutating func insert (_entity: Entity, beforeIndex index: Int)
/// Adds the specified sequence of entities to this collection in order,
/// directly before the entity at the given index.
///
///—Parameters:
///—sequence: A sequence of entities to add to the collection.
///—index: The index of an entity to insert in front
/// of. If 'endIndex' is provided, the
/// entities will be appended.
mutating func insert<S> (contentsOf sequence: S, beforeIndex index: Int) where S: Sequence, S.Element: Entity
/// Removes the entity from the collection.
///—Parameters:
///—entity: The entity to remove from the collection.
mutating func remove (_entity: Entity)
/// Removes the entity at the given index from this collection.
///—Parameters:
///—index: The index of the entity to remove from the collection.
mutating func remove (at index: Int)
/// Removes all entities from this collection.
mutating func removeAll ( )
/// Removes all entities from this collection that satisfy the given predicate.
mutating func removeAll (where: (Entity) throws→Bool) rethrows
/// Replaces all entities in this collection with those from the given
/// sequence.
///—Parameters:
///—entities: The sequence of entities that will replace
/// the collection's current contents.
mutating func replaceAll<S> (_entities: S) where S: Sequence, S.Element: Entity
}
/// A protocol representing the content of a "View".
/// You usually do not need to interface with this protocol directly. On mixedrealityOS,
/// you use "ViewContent" with your "View", while on phoneOS anc
/// computerOS, you use "ViewCameraContent".
@available(mixedrealityOS, phoneOS, computerOS)
public protocol ViewContentProtocol {
/// The type of collection used for 'entities'.
associatedtype Entities: EntityCollection
/// The 3D framework entities to be displayed in this "View".
var entities: Entities {get nonmutating set}
/// Subscribes to the provided 3D framework "Event".
///
///—Parameters:
///—'event': The 3D framework "Event" type to subscribe to.
///—'sourceObject': An optional "EventSource" to filter events to
/// (e.g., an entity). If no source is provided, the resulting
/// subscription will receive events for all objects in this
/// "View".
///—'componentType': An optional "Component" type to filter events
/// to. If no component type is provided, the resulting subscription
/// will receive events for all components in this "View", if
the event type is for a component.
///—'handler': A closure to run when the 'event' occurs.
///
///—Returns: A value representing the subscription to this event stream.
Call "cancel( )" on this value to end the subscription.

```
func subscribe<E: Event>(to event: E.Type,
  on sourceObject: EventSource?,
  componentType: Component.Type?,
  _ handler: @escaping (E) -> Void) -> EventSubscription
}
```

@available (mixedrealityOS, phoneOS, computerOS
extension ViewContentProtocol {
/// Adds 'entity' to this content.
public func add (_entity: Entity)
/// Removes 'entity' from this content, if present.
public func remove (_entity: Entity)
/// Subscribes to the provided 3D framework "Event".
///
///—Parameters:
///—'event': The 3D framework "Event" type to subscribe to.
///—'sourceObject': An optional "EventSource" to filter events to
/// (e.g., an entity). If no source is provided, the resulting
/// subscription will receive events for all objects in this
/// "View".
///—'handler': A closure to run when the 'event' occurs.
///
///—Returns: A value representing the subscription to this event stream.
/// Call "cancel( )" on this value to end the subscription.
public func subscribe<E: Event> (to event: E.Type,
on sourceObject: EventSource?,
handler: @escaping (E)→Void)→EventSubscription
/// Subscribes to the provided 3D framework "Event".
///
///—Parameters:
///—'event': The 3D framework "Event" type to subscribe to.
///—'componentType': An optional "Component" type to filter events
/// to. If no component type is provided, the resulting subscription
/// will receive events for all components in this "View", if
/// the event type is for a component.
///—'handler': A closure to run when the 'event' occurs.
///
///—Returns: A value representing the subscription to this event stream.
/// Call "( )" on this value to end the subscription.

```
public func subscribe<E: Event>(to event: E.Type,
    componentType: Component.Type? = nil,
    _ handler: @escaping (E) -> Void) -> EventSubscription
}
```

/// A collection of entities in a “View”.
///
/// This collection is used by “ViewContentProtocol/entities”.

```
@available(mixedrealityOS, phoneOS, computerOS)
public struct ViewEntityCollection: EntityCollection
{
  // Note: boilerplate details of EntityCollection protocol conformance
  // omitted for brevity
}
```

/// The content of a “View” that is displayed inline.
/// On mixedrealityOS, ‘ViewContent’ is used to display your 3D framework content
/// inline in true 3D space, occupying the available space in your app's 3D
/// bounds.
///
/// You can use ‘ViewContent’ to add and remove entities, subscribe to
/// 3D framework events, and perform coordinate conversions between 3D framework
/// entity space and a 2D framework View's coordinate space.

```
@available(mixedrealityOS)
public struct ViewContent: ViewContentProtocol {
  public var entities: ViewEntityCollection { get nonmutating set }
  public func subscribe<E: Event>(to event: E.Type,
    on sourceObject: EventSource?,
    componentType: Component.Type?,
    _ handler: @escaping (E) -> Void) -> EventSubscription
```

/// The default view contents of a “View” using
/// “ViewContent”.
///
/// You don't create this type directly. “View” creates values for
/// you.

```
    public struct Body<Placeholder: View>: View { }
  }
  @available(mixedrealityOS)
  extension ViewContent {
```

/// Convert the provided point from an entity to a 2D framework coordinate space.
///
///—Parameters:
///—‘point’: The point to be converted. This point is interpreted in
/// 3D framework entity coordinates. This means the value is expected to
/// be expressed in meters, with the Y axis pointed up, and expressed
/// relative to the entity's origin.
///—‘entity’: The entity that ‘point’ should be interpreted in. If no
/// entity is provided, the value is interpreted to be in the
/// coordinate space of the “ViewContent”.
/// —‘space’: The 2D framework coordinate space in which the resulting point
/// should be expressed.
///
///—Returns: A converted point expressed in 2D framework coordinates. This
/// means the value will be expressed in points, with the Y axis pointing
/// down, and expressed relative to the coordinate space's
/// top-leading-back origin.

```
public func convert(
  _ point: SIMD3<Float>, from entity: Entity? = nil, to space:
  CoordinateSpace
) -> Point3D
```

/// Convert the provided rect from an entity to a SwiftUI coordinate space.
///
///—Parameters:
///—‘bounds’: The bounds to be converted. These bounds are interpreted in
/// 3D framework entity coordinates. This means the value is expected to
/// be expressed in meters, with the Y axis pointed up.
///—‘entity’: The entity that ‘rect’ should be interpreted in. If no
/// entity is provided, the value is interpreted to be in the
/// coordinate space of the “ViewContent”.
///—‘space’: The 2D framework coordinate space in which the resulting rect
/// should be expressed.
///
///—Returns: A converted rect expressed in 2D framework coordinates. This means
/// the value will be expressed in points, with the Y axis pointing down,
/// and expressed relative to the coordinate space's top-leading-back
/// origin.

```
public func convert(
  _ bounds: BoundingBox, from entity: Entity? = nil, to space:
  CoordinateSpace
) -> Rect3D
```

/// Convert the provided point from a 2D framework coordinate space to an entity.
///
///—Parameters:
///—‘point’: The point to be converted. This point is interpreted in
/// 2D framework coordinates. This means the value is expected to be
/// expressed in points, with the Y axis pointing down, and expressed
/// relative to the coordinate space's top-leading-back origin.
///—‘space’: The 2D framework coordinate space in which ‘point’ should be
/// interpreted.
///—‘entity’: The entity that the resulting point should be expressed /// in. If no entity is provided, the value is interpreted to be in
/// the coordinate space of the "ViewContent".
///
///—Returns: A converted point expressed in 3D framework entity coordinates.
/// This means the value will be expressed in meters, with the Y axis
/// pointed up, and expressed relative to the entity's origin.

```
public func convert(
  _ point: Point3D, from space: CoordinateSpace, to entity: Entity? = nil
) -> SIMD3<Float>
```

/// Convert the provided rect from a SwiftUI coordinate space to an entity.
///
///—Parameters:
///—'rect': The rect to be converted. This rect is interpreted in
/// 2D framework coordinates. This means the value is expected to be
/// expressed in points, with the Y axis pointing down, and expressed
/// relative to the coordinate space's top-leading-back origin.
///—'space': The 2D framework coordinate space in which 'rect' should be
/// interpreted.
///—'entity': The entity that the resulting rect should be expressed
/// in. If no entity is provided, the value is interpreted to be in
/// the coordinate space of the "ViewContent".
///
///—Returns: A converted bounding box expressed in 3D framework entity coordinates.
/// This means the value will be expressed in meters, with the Y axis
/// pointed up, and expressed relative to the entity's origin.

```
  public func convert(
    _ rect: Rect3D, from space: CoordinateSpace, to entity: Entity? = nil
  ) -> BoundingBox
}
```

/// The content of a "View" that is displayed through a camera.
///
/// On phoneOS, 'ViewCameraContent' displays content in an AR camera view by
/// default, and can display in a "non-AR" mode when requested or when AR or the
/// device's camera is unavailable. On computerOS, 'ViewCameraContent' always
/// displays its content in a non-AR mode.
///
/// You can use 'ViewCameraContent' to add and remove entities, subscribe
/// to 3D framework events, configure the AR environment, and perform coordinate
/// conversions such as projections and raycasts between the "View"'s
/// space and a 2D framework View coordinate space.
@available (phoneOS)
@available (computerOS)
public struct ViewCameraContent: ViewContentProtocol
{
public typealias DebugOptions=ARView.DebugOptions
public typealias RenderOptions=ARView.RenderOptions
public typealias Environment=ARView.Environment
/// Options for drawing overlay content in a scene that can aid in
/// debugging.
public var debugOptions: DebugOptions
/// Options for enabling/disabling specific rendering effects.
public var renderOptions: RenderOptions
/// Description of background, lighting and acoustic properties for your AR
/// scene.
public var environment: Environment
/// Selects the entity which defines the origin of the physics simulation in
/// the scene.
///
/// By default, the origin of the physics simulation coincides with the
/// origin of the scene. However, in many AR applications, the physics
/// simulation should be relative to a certain anchor in the scene.
///
/// For example: An AR app simulates a game of Jenga. The Jenga blocks are
/// added as entities with rigid body components to a scene. The app detects
/// an anchor (marker or plane) at which the game should be placed in
/// real world. The physics simulation should be relative to the detected
/// anchor. The anchor can be moved around in the real world without
/// affecting the physics simulation.
///
/// To achieve this:
/// 1. Add a new entity to the scene that tracks the anchor position.
/// 2. Set 'physicsOrigin' to the entity to indicate that this entity's
/// transform determines the origin of the physics simulation.
/// 3. Optionally, parent the Jenga blocks to the anchor entity. This way
/// the Jenga blocks are automatically updated when the anchor position
I//changes.
///
/// Example:
/// View {content in
/// // Define your anchor entity and add it to the scene.
/// let myAnchor=AnchorEntity (.image (group: "References", name: "GameImage"))
/// content.add (myAnchor)
/// //Set myAnchor as the origin of the physics simulation.
/// content.physicsOrigin=myAnchor
///
/// // Add the simulated blocks to the anchor.
/// myAnchor.children.append (block0)
/// myAnchor.children.append (block1)
///}
/// '''

/// Using this setup, all forces, velocities, etc. will be simulated
/// relative to ‘myAnchor’. Moving the anchor will not affect the
/// simulation.
public var physicsOrigin: Entity?
/// The entity which defines the listener position and orientation for
/// spatial audio.
///
/// By default this ‘audioListener’ property is nil, which means that the
/// active camera entity will be used as the audio listener. The
/// ‘audioListener’ can be set to any entity in the ‘scene’ to use the
/// transform of the entity as the audio listener position and orientation.
public var audioListener: Entity?
public enum CameraMode {
/// Use non-AR rendering, with a background defined by the ‘environment’
/// property.
case nonAR
/// Use a default “ARSession” that is created and automatically
/// managed by the view after initialization. This is the default value.
case automaticAR
/// Provide a custom “ARSession” that powers this “View”’s AR
/// rendering.
///
/// If you have an existing or custom session, set it as the view’s
/// session to replace the default session and run it by calling
/// ‘session.run (_:options:)’.
case manualAR (ARSession)
}
public var cameraMode:CameraMode
/// The default view contents of a “View” using “ViewCameraContent”.
///
/// You don’t create this type directly. “View” creates values for you.
public struct Body<Placeholder: View>: View { }
}
@available (phoneOS)
@available (computerOS)
extension ViewCameraContent {
/// Projects a point ‘point’ from the 3D world coordinate system of the
/// scene to the 2D pixel coordinate system of the view-port.

```
public func project(
    vector: SIMD3<Float>, to space: CoordinateSpace
) -> CGPoint?
```

/// Unproject a 2D point from the view onto a plane in 3D world coordinates.
///
/// A 2D point in the view’s coordinate space can refer to any point along a
/// line segment in the 3D coordinate space. Unprojecting gets the 3D
/// position of the point along this line segment that intersects the
/// provided plane.
///
///—Parameters:
///—‘point’: A point in the provided coordinate space.
///—‘space’: The coordinate space in which ‘point’ should be
/// interpreted.
///—‘planeTransform’: The transform used to define the coordinate
/// system of the plane. The coordinate system’s positive Y axis is
/// assumed to be the normal of the plane.
///—‘relativeToCamera’: If the plane transform is relative to camera
/// space or world space. Defaults to false.
///—Returns: 3D position in world coordinates or nil if unprojection is
/// not possible.

```
public func unproject(
    point: CGPoint, from space: CoordinateSpace, ontoPlane: float4x4,
    relativeToCamera: Bool = false
) -> SIMD3<Float>?
```

/// Unprojects a 2D point ‘point’ in the pixel coordinate system of
/// ‘viewport’, converting it to a view-space 3D coordi-nate.

```
public func unproject(
    point: CGPoint, viewport: CGRect
) -> SIMD3<Float>?
```

/// Calculates a ray in the AR scene that corresponds to point on screen.
///—Parameters:
///—‘point’: A point in the provided coordinate space.
///—‘space’: The coordinate space in which ‘point’ should be
/// interpreted.
///—Returns: A ray in AR scene coordinates that goes from the camera
/// origin through the specified ‘point’ on screen.

```
public func ray(
    through: CGPoint, in space: CoordinateSpace
) -> (origin: SIMD3<Float>, direction: SIMD3<Float>)?
```

/// Gets the closest entity in the AR scene at the specified point on
/// screen.
///
///—Parameters:
///—‘point’: A point in the provided coordinate space.
///—‘space’: The coordinate space in which ‘point’ should be
interpreted.
///
///—Returns: The entity at ‘point’. Returns ‘nil’ if no entity was found.

///
///—Important: Hit tests (ray-casts) are performed against the collision
/// shapes. Entities without a proper 'CollisionComponent' (see
/// 'HasCollision') are ignored in hit tests!

```
public func entity(
  at point: CGPoint, in space: CoordinateSpace
) -> Entity?
```

/// Gets all entities in the AR scene at the specified point on screen.
///
///—Parameters:
///—'point': A point in the provided coordinate space.
///—'space': The coordinate space in which 'point' should be
interpreted.
///
///—Returns: A list of entities at 'point'. Returns an empty array if no
/// entities were found.
///
///—Important: Hit tests (ray-casts) are performed against the collision
/// shapes. Entities without a proper 'CollisionComponent' (see
/// 'HasCollision') are ignored in hit tests!
public func entities (
at point: CGPoint, in space: CoordinateSpace)
> [Entity]
/// Searches the scene for entities at the specified point in the view.
///
///—Parameters:
///—'point': A point in the provided coordinate space.
///—'space': The coordinate space in which 'point' should be
/// interpreted.
///—'query': The query type.
///—'mask': The collision mask. This value can be used to prevent
/// hits with certain objects. The default value is
/// 'CollisionGroup.all', which means the ray can hit all objects. See
/// 'CollisionFilter' for details.
///
///—Returns: An array of hit-test results.
///
///—Important: Hit-tests are performed against the collision shapes.
/// Entities without a proper 'CollisionComponent' (see 'HasCollision')
/// are ignored in hit tests!
///
/// To make a hit-test against real-world objects call 'hitTest(_: types:)'.

```
public func hitTest(
  point: CGPoint, in space: CoordinateSpace,
  query: CollisionCastQueryType, mask: CollisionGroup
) -> [CollisionCastHit]
}
"'
```

Here is a simple example showing how physics can be configured within a 'View', observing collision events as they occur and updating the UIL.

```
struct PhysicsExample: View {
  @State var collisionCount = 0
  @State var subscription: EventSubscription?
  var body: some View {
    View { content in
      let floor = ModelEntity(mesh: .generateBox(width: 1, height: 1, depth: 1))
      floor.collision = CollisionComponent(shapes: [.generateBox(width: 1, height:
1, depth: 1)])
      floor.physicsBody = PhysicsBodyComponent(shapes: [.generateBox(size:
[1,1,1])], mass: 1, material: nil, mode: .static)
      floor.position.y = -0.6
      content.add(floor)
      let box = ModelEntity(mesh: .generateBox(size: 0.1))
      box.collision = CollisionComponent(shapes: [.generateBox(size:
[0.1,0.1,0.1])])
      box.physicsBody = PhysicsBodyComponent(shapes: [.generateBox(size:
[0.1,0.1,0.1])], mass: 1)
      box.position.y = 0.3
      content.add(box)
      subscription = content.subscribe(to: CollisionEvents.Began.self) {
        collisionCount += 1
      }
    }
    .overlay(alignment: .bottom) {
      Text("Collision Count: \(collisionCount)")
        .padding( )
        .background(.regularMaterial, in: Capsule( ))
    }
  }
}
"'
```

Here is a complete example of an app loading a 3D model asynchronously, showing a progress indicator while waiting and an error message if the model could not be loaded.

```
struct AsyncModelExample: View {
  @State var error: Error?
  var body: some View {
    if let error {
      Text("Error! \(error.localizedDescription)")
    } else {
      View { content in
        do {
          let model = try await ModelEntity(named: "computer system __closed")
          model.transform.rotation = simd_quatf(angle: .pi/4, axis: [0,1,0])
          model.transform.translation.y = −0.08
          let lid = model.findEntity(named: "lid") as? ModelEntity
          lid?.transform.rotation = simd_quatf(angle: −1.919, axis: [1,0,0])
        } catch {
          self.error = error
        }
      } placeholder: {
        ProgressView( )
      }
    }
  }
}
‵‵‵
```

some examples, 2D framework-based UI content can be mixed in a 3D framework hierarchy, using the ‘View’ symbols API proposed. This API uses an additional ‘ViewBuilder’ parameter that naturally extends the ‘View’ closure-based syntax, similar to the ‘Canvas’ API:

```
View { content in
  ...
} symbols: {
  ...
}
‵‵‵
```

An alternative to “View” as proposed is to instead model it as a protocol. One possible version of a protocol-based approach is described as ‘ViewRepresentable’. In some examples, there is value in having *both* an inline closure-based API as proposed herein and a protocol-based API.

The simple use cases of ‘View’ are easier and more convenient to express as a view than as a protocol. For example:

```
View { content in
  content.add(ModelEntity(...))
}
‵‵‵
```

Or, if we added a convenience initializer that takes an entity directly, as noted in the Future Directions section:

```
‵‵‵swift
View(modelEntity)
‵‵‵
```

As opposed to a protocol-based approach, which requires extracting the view out into a separate type:

```
‵‵‵swift
struct ModelView: ViewProtocol {
  func makeContent(__ content: inout Content) {
    content.add(ModelEntity(...))
  }
}
‵‵‵
```

In some examples, it is important to be able to apply modifiers directly to a ‘View’ without having to wrap it in its own distinct type. With the other Representable types, a 2D framework and an application framework provide enough functionality that it’s reasonable to expect these views to typically be “islands” that don’t require a ton of back-and-forth with another 2D framework modifiers or views. In some examples with a 3D framework, that isn’t the case. In Other potential extensions noted in the *Future Directions* section are worth considering too, like control over the ‘View’’s scope, e.g.: View (scope: .isolated) {content in . . . }

. . .

Or supporting different rendering styles like portals, e.g.: View (style: .portal, cameraPosition: Point3D ( . . . )) {content in . . . }

. . .

These sorts of extensions are also representable using a protocol, but can be more elegantly and concisely expressed using a single ‘View’ type with a variety of initializers.

In a similar vein to the protocol-based ‘View’ described above, 2D framework for mixedrealityOS has for some time supported 3D framework integration via an ‘EntityRepresentable’ protocol modeled after an existing 2D framework and an application framework Representable types (e.g., “UIViewRepresentable”). While there is value in treating 3D framework entities as a peer to ‘UIView’s and ‘NSView’s, we have in practice found this model to be a poor fit for 3D framework for a few reasons:

Clunky layout semantics: Unlike 2D framework and application framework, 3D framework has no notion of a layout system, and thus there is no good intrinsic size to use for an ‘EntityRepresentable’. This could be partially addressed by exposing a public ‘size ThatFits’ API to allow developers to provide a fitting size, defaulting to a flexible size. This would still result in sizing semantics that differ from the other Representable types, however. 3D framework lacks UI frameworks capabilities: Unlike the other Representable types, 3D framework entities do not have a gesture system, a responder chain for event handling, a notion of environment/preferences for hierarchical data flow, and other features common to 2D framework, an application framework, and another 3D framework. We have retrofitted some of these capabilities for entities in 2D framework, but we have no intention of shipping this as API. *This is not a bad thing—*3D framework does not need these tools for the use cases it is built for—but it implies a different design for how to integrate 3D framework content in a 2D framework hierarchy, as well as how to mix 2D framework content in a 3D framework hierarchy (the subject of a separate proposal). Poor cross-platform compatibility: ** An 'EntityRepresentable' API is unlikely to be a good fit to bring to phoneOS and computerOS. While 3D framework is a more foundational framework for content on mixed-realityOS, the same is not true of phoneOS and computerOS. An API structure like 'EntityRepresentable' implies a level of deep integration with 2D framework that is not present on those platforms. Further, many phoneOS and computerOS APIs may not make sense in an 'EntityRepresentable' context, and the semantics of an 'EntityRepresentable' API seem like a poor fit for a top-level entry point into 3D framework, where APIs like anchoring are expected to be used instead.

Split View into Multiple Views

Instead of consolidating around a single 'View' type, we could publish multiple new Views that offer different APIs and functionality based on their use cases. For example, we could add an 'EntityView' type designed for the "shared scope" scenario, displaying an entity hierarchy inline:

```
EntityView { entity in
   entity.addChild(ModelEntity(...))
}
```‵
```

The entity provided to clients would be an Entity subclass with additional

"top-level" functionality like the ability to subscribe to events, convert

coordinate spaces to and from 2D framework, etc.

We would also add a 'View' variant that is instead tailored to the

"isolated scope" scenario, providing a '3D framework.Scene' directly:

```
```‵swift
View { scene in
   scene.addEntity(ModelEntity(...))
}
```‵
```

Similarly, this would also provide a '3D framework.Scene' subclass with additional functionality. Additional View types could be added in the future for other use cases, like a 'RealityCamera' type for displaying a camera into another scene.

This approach would allow us to reuse existing 3D framework abstractions. However, it has a few downsides: It further bifurcates the API between mixedrealityOS and phoneOS/computerOS. We are likely not able to support isolation or multiple scenes within an app for v1, nor are we likely to support shared entity hierarchies for some time on phoneOS or computerOS. Therefore, "View" as described above would only be available on phoneOS and computerOS, while 'EntityView' would only be available on mixedrealityOS. This would hopefully be lifted eventually, but would take some time. There is likely not enough API differentiation between these cases. Clients of 'Entity View' are likely to need many of the same APIs as "View, like coordinate conversions, event subscriptions, and the ability to mix in UI with the entity hierarchy (to be addressed in a follow-up proposal). It is difficult to name these APIs clearly, in a way that justifies the differentiation between them. Developers new to 3D framework may find having both an 'EntityView' and a 'View' to be confusing, especially since the primary decision factor on when to use one or the other is based on whether the developer wants a shared or isolated scope, something that is not communicated in the names themselves. As the number of use cases grows over time, this approach may require the introduction of many new views, e.g. a 'Portal' type for hosting 3D framework content in a portal.

Previous versions of this proposal have advocated for either a 3D framework Scene or Entity at the root of a 'View' instead of the proposed 'ViewContentProtocol' protocol. There are a few different forms this can take that we'll enumerate:

Using a 3D framework Scene (specifically a subclass) uniformly within a 'View' would lean into the Scene being a "namespace" for a 'View', and would effectively always enforce an isolated scope for a 'View'. This was rejected for a few reasons: It is likely not doable in the mixedrealityOS 1.0 timeframe, as it requires support for multiple scenes in 3D framework. Scenes in 3D framework are somewhat heavyweight, so this would not work well in cases where performance is important, e.g. if many 'View's were displayed in a grid in an app's UI. The '3D framework.Scene' type conflicts with the '2D framework.Scene' type, and thus requires an explicit module qualifier whenever it is referenced in any code that imports both frameworks. This makes '3D framework.Scene' an awkward type to use within 2D framework, and thus we should avoid leaning too heavily into abstractions that use it.

Using an Entity subclass uniformly within a "View" would leave open the possibility that 'View' could use either a shared or isolated scope, while also reusing an existing 3D framework abstraction. This seems more tractable than using Scene uniformly, but was also rejected: It requires introducing several "top-level" concepts on this Entity subclass that were previously on Scene, like the ability to subscribe to events, and particularly on phoneOS and computerOS, ray-casting into the scene, controlling its ARSession, etc. This blurs the lines between an Entity and a Scene in 3D framework, which could be confusing to developers. Some APIs are quite awkward to introduce directly on an Entity type. To name two examples: The follow-up proposal to mix UI content in a 'View' may propose using "symbols" to represent UI that is provided directly from a 'View' ViewBuilder, which can then be added to the developer's entity hierarchy. This API would be strange to use from an Entity subclass, as clients would access symbols from an 'entity.symbols' property and then need to add each symbol to the hierarchy-even though the API would suggest that the symbols are already a part of the root entity. In the future we may wish to allow apps to provide an existing 3D framework Scene directly to a "View". This may compose awkwardly with a root Entity type provided by the "View". It enforces a single uniform interface across all 'View's. This limits future API flexibility to restrict functionality based on context—for example, if some APIs should only be available when in an isolated scope, like controlling the physics origin.
```

One other option could be to provide either an Entity or a Scene to the body of a 'View' depending on some context or signal. For example, based on an explicit scope:

```
View(scope: .shared) { entity in ... }
View(scope: .isolated) { scene in ... }
```
```

This would improve API flexibility and allow a more appropriate type to be provided based on context. However, this approach suffers from many of the same downsides as described in the *Split 'View' into multiple views* alternative above. Further, the problems described there seem worse in this case, as there is a surprising API jump occurring within the same View type. This jump is far less noticeable with the proposed 'ViewContentProtocol' approach, as the terminology used is consistent, with common functionality captured directly in the protocol, and in most cases occurs transparently to the developer.

In addition, this differentiation would be quite awkward in v1, where mixedrealityOS would only support a shared scope and phoneOS/computerOS would only support an isolated scope. This means the default initializers for 'View' would use different types on each platform, further bifurcating code across platforms. Some other names were considered in the proposed API.

Alternatives include: 'ViewState', 'ViewContext', 'ViewSubscene'

Note that nesting types within the 'View' type was rejected due to the use of a generic type, making it impossible for clients to write types like 'View.Content', as they would need to provide a concrete type to 'View' like 'View<ViewContent>.Content'.

The names for the various 'ViewContent' types would ideally be less verbose, with names like 'Content' and 'CameraContent'. These names seemed a bit too general to warrant dropping the namespace prefix, however, and the hope is that clients will rarely if ever have to use these types directly.

Alternatives to 'ViewCameraContent' were considered, like 'ViewProjectedContent' and 'ViewportContent', which also express the general concept of a 2D projection into a 3D environment, both in AR and non-AR contexts. Including "camera" in the name seemed like the most straightforward way to encapsulate this, and also offers consistent terminology with some of its APIs like 'cameraMode'.

Other names that lean more on the "AR" capabilities were also considered, like 'ViewARCameraContent' and 'ViewARContent'. These were rejected to allow the same API to express a non-AR render-to-texture mode on mixedrealityOS in the future.

Alternatives to 'ViewContent' were also considered, like 'ViewInlineContent' (as proposed in a previous version of this proposal), 'ViewEmbeddedContent', or simply 'RealityContent'. We ultimately landed on ViewContent to convey the primacy of using 3D framework content embedded in a true 3D context.

'ViewContentProtocol' was named 'ViewContent' in a previous version of this proposal, but we ultimately determined that using the 'Protocol' suffix would be the most appropriate way to preserve the primacy of the concrete 'ViewContent' type while still conveying the notion that all conformances are kinds of content for a 'View'. The 'Protocol' suffix is somewhat unfortunate, but this does follow a precedent of other protocols in Swift like 'StringProtocol', as well as in frameworks like 2D framework with 'CoordinateSpaceProtocol'.

A previous version of this proposal included support for 3D framework raycasting via 'ViewCameraContent' on phoneOS, providing parity with 'View' on phoneOS. We have opted to remove this support from the proposal for now while we take more time to determine the right shape of that API and align better with future directions for 3D framework on phoneOS.

A strong goal of this 3D framework and 2D framework integration effort is to enable "80% 3D framework, 20% 2D framework" apps: that is, apps that are primarily simulation-driven, but would like to mix in some UI. To support these cases, we need to provide apps with the tools to host 2D framework Views within a 'View''s entity hierarchy. Extending the notion of "symbols" as used in 2D framework 'Canvas' API for inserting 2D framework Views as 3D framework entities.

While 'View' is intended to compose well with the existing 2D framework Gesture APIs, there are a few pieces that require new APIs: The ability to determine which entity was hit-tested for a given gesture, Conveniences to convert a given gesture's value into 3D framework coordinates, A lower-level gesture primitive to receive raw touches for use in some clients that need more direct access to this data, like third-party game engines. These will be addressed in follow-up proposals.

The proposed 'View' API is great for lightweight uses of 3D framework, and while it can scale up to complex use cases, we believe there is merit to also providing a more advanced API that scales better to these use cases. In particular, a protocol-based API could help: Improve ergonomics of asynchronously-loaded state, avoiding the optional dance required when using async state stored as 2D framework '@State' loaded in a '.task' modifier, Providing better facilities for handling errors, e.g. should a loading operation throw an error, Serving as a natural scope for more complex imperative code using 3D framework.

We are investigating a supplemental protocol for addressing these advanced uses of 'View', tentatively termed 'ViewRepresentable', which could look something like this:

```
@MainActor
protocol ViewRepresentable: View where Body == Never {
  associatedtype AsyncState = Void
  associatedtype Content: ViewContentProtocol = ViewDefaultContent
  func makeState( ) async throws -> AsyncState
  func makeContent(_ content: inout Content, state: inout AsyncState)
  func updateContent(_ content: inout Content, state: inout AsyncState)
}
#if os(mixedrealityOS)
typealias ViewDefaultContent = ViewContent
#else
typealias ViewDefaultContent = ViewCameraContent
#endif
```
```

This protocol is analogous to the proposed closure-based structure of 'View', with a few extra features. Most notably, this includes support for loading async state required before the view can be shown via the 'maksState( )' function and 'AsyncState' associated type. This state is then passed in to the 'makeContent' and 'updateContent' functions, in a similar fashion to the 'Cache' in the 'Layout' protocol. 'makeState( )' is also marked 'throws', allowing clients to propagate errors up to the outer view if desired. A 'ViewRepresentable' could then be used either as a 'View' directly, translating it into a 'View' behind the scenes, or by using some special 'callAsFunction'-type view builders to support use of a placeholder or [symbols](https://github.pie-.apple.com/TDG/SwiftUI-Evolution/pull/12).

For example, a simple 'ViewRepresentable' could be defined as:

```
'''swift
struct ExampleRepresentable: ViewRepresentable {
  @Observable class AsyncState {
    var model: ModelEntity
  }
  func makeState( ) async throws -> AsyncState {
    let model = try await ModelEntity("...")
    return AsyncState(model: model)
  }
  func makeContent(_ content: inout Content, state: inout AsyncState) {
    content.add(state.model)
  }
}
'''
```

And used either directly as a view:

```
'''swift
struct ExampleView: View {
  var body: some View {
    ExampleRepresentable( )
  }
}
'''
```

Or using ViewBuilder-like syntax, where the representable is given access to a View proxy view to which modifiers like '.gesture' can be applied:

```
'''swift
struct ExampleView: View {
  var body: some View {
    ExampleRepresentable { state, view in
      view.gesture(...)
    }
  }
}
'''
```

As well as the ability to provide a placeholder view and/or symbols:

```
'''swift
struct ExampleView: View {
  var body: some View {
    ExampleRepresentable { state, view in
      view.gesture(...)
    } placeholder: {
      ProgressView( )
    } symbols: { state in
      @Bindable $state = state
      Toggle("Enabled", isOn: $state.foo)
        .tag("toggle")
    }
  }
}
'''
```

A 'ViewRepresentable' could be initialized with additional parameters as needed, and could work with dynamic properties like '@State' and '@Binding' directly. This allows additional state to be passed in from the containing view; for example:

```
struct ExampleRepresentable: ViewRepresentable {
  // mutable state that the representable could write to, e.g.
  // if a collision event occurs
  @Binding var showAlien: Bool
  // immutable state passed from the view
  var showDebugUI: Bool
  ...
}
struct ExampleView: View {
  @State var showAlien = false
  @State var showDebugUI = false
  var body: some View {
    ExampleRepresentable(
      showAlien: $showAlien, showDebugUI: showDebugUI
    ) { state, view in
      view.gesture(...)
    }
    Toggle("Show Debug UI", isOn: $showDebugUI)
  }
}
'''
```

Error handling could also be provided by passing a 'Phase' into the view closure, similar to the 'AsyncImage' API:

```
struct ExampleView: View {
  @State var showAlien = false
  var body: some View {
    ExampleRepresentable(showAlien: $showAlien) { phase, view in
      switch phase {
      case .success(let state):
        view.gesture(...)
      case .failure(let error):
        Text(error.localizedDescription)
      case .empty:
        ProgressView( )
      }
    } symbols: { state in
      Toggle("Show Alien", isOn: $showAlien)
        .toggleStyle(.button)
    }
  }
}
'''
```

This direction is still under consideration and may be proposed as a follow-up to the core 'View' API.

As noted earlier, we would like to give apps control over a 'View''s isolation: that is, whether it maintains its own independent set of systems that are unaware of other entities in the app. Once 3D framework can support the ability to host multiple Scenes within an app, we would like to expose control over this in 'View'. One way this could be done is by adding new initializers to optionally provide a scope, like so:

```
View(scope: .isolated) { content in
  ...
}
'''
```

We would likely want to enforce the use of a static scope, as dynamically changing the scope is unlikely to be possible or desirable. We could do so through the use of generics, creating new scope types like so:

```
public protocol ViewScope { ... }
public struct IsolatedViewScope: ViewScope { }
public struct SharedViewScope: ViewScope { }
```

-continued

```
extension ViewScope where Self == IsolatedViewScope {
  public static var isolated: IsolatedViewScope { .init( ) }
}
extension ViewScope where Self == SharedViewScope {
  public static var shared: SharedViewScope { .init( ) }
}
```
```

And extending 'View' to make use of them:

```
extension View {
  public typealias Scope = ViewScope
  public init<S: Scope>(
    scope: S,
    make: @escaping (inout Content) -> ( ),
    update: ((inout Content) -> ( ))? = nil
  ) where Content == ViewScopedContent<S> {
    content = Content(make: make, update: update)
  }
}
```
```

Another form of lighter-weight isolation would be to allow custom Systems to query for entities by 'View', such that they can group certain behaviors per 'View'. This could potentially be done by providing an opaque namespace ID to 'ViewContent' like so:

```
extension ViewContent {
  public var namespace: AnyHashable { get }
}
```
```

Which could then be queried on the Scene:

```
class MySystem: System {
  func update(context: SceneUpdateContext) {
    // For a specific View:
    var targetNamespace = ...
    context.scene.performQuery(
      EntityQuery(where: .namespace(matches: targetNamespace)
    ) { entity in
      // ...
    }
    // For each View:
    context.scene.performQuery(
      GroupedEntityQuery(by: .namespace)
    ) { entities in
      // ...
    }
  }
}
```
```

Further exploration is needed here. For now, developers can work around this without any new API by relying on a custom component:

```
struct MyRootComponent: TransientComponent, Codable { }
struct MyView: View {
  var body: some View {
    View { content in
      var rootEntity = Entity( )
      rootEntity.components.set(MyRootComponent( ))
      // Add mores entities:
      rootEntity.children.append(...)
      content.add(rootEntity)
    }
```

-continued

```
    }
  }
  class MySystem: System {
    func update(context: SceneUpdateContext) {
      // For each View:
      context.scene.performQuery(EntityQuery(where:
  .has(MyRootComponent.self))) { rootEntity in
        // For each entity in View:
        context.scene.performQuery(EntityQuery(where:
  .isDescendant(of: rootEntity))) { entity in
          ...update View entities...
        }
      }
    }
  }
```
```

Some apps will want to render their 3D content within a 2D surface, using either a perspective-aware portal: ![Portal](portal-example.png) Or a render-to-texture technique: ![Render-to-Texture](render-to-texture-example.png)

These use cases require the use of an isolated 3D framework Scene under the hood. We could potentially represent this using a new 'style' property on 'View', like so:

```
View(style: .portal) { content in ... }
View(style: .viewport) { content in ... }
```
```

The style type would be statically typed and used to infer available properties of the content. To control the perspective from which the content is viewed, an optional 'cameraPosition' property could be provided:

```
View(style: .portal, cameraPosition: Point3D(...)) { content in ... }
```
```

The layout semantics of a 'View' in this configuration would be slightly different, as it would occupy zero depth. The 'viewport' style for render-to-texture use cases would reuse the 'ViewCameraContent' type from phoneOS and computerOS, while the 'portal' style may be best expressed with a separate 'ViewContentProtocol' type, or could reuse the same content type as well.

Some apps may want the ability to display a camera with another view into the same shared scene. For example, consider this mockup for a car configurator app: `![Car Configurator App Mockup](car-configurator-app-mockup.png)`

Here cameras into the shared car scene are used in the configurator's UI. This could be done by, for example, providing a 'PerspectiveCamera' to a 'View' like so:

View (viewing: perspectiveCamera)

. . .

Or perhaps by constructing the 'View' with an existing Scene type:

View (viewing: sharedScene) { content in content.camera=PerspectiveCamera( )

}

. . .
```

Some apps simply need to display a single entity inline in their hierarchy. For this case, we could provide a simple variant of 'View' that directly takes an entity:

''' swift

View (entity)

'''

The primary concern with this approach is that it could imply to developers that the 'View' will be sized automatically to match the size of the entity, which would not be the case and is unlikely to be feasible for reasons described earlier. However, the convenience of this API could still be worthwhile, provided these sizing semantics are communicated clearly.

An often-requested enhancement to 3D framework is to provide a declarative, value-type interface for constructing entity hierarchies, similar to 2D framework views. This would fit in nicely with 'View', enabling developers to use a consistent declarative programming style throughout their hierarchy. Such an API is quite an ambitious undertaking, however, and requires solving a number of challenges, like: Reconciling existing reference types (like 'Entity') with new declarative versions (e.g., what names can or should they use?), Supporting mechanisms like '@State' in a way that works with 3D framework, Interoperation with other ECS-based concepts like custom Systems One approach that was attempted was the use of Swift Concurrency and the AsyncSequence to utilise 3D framework Events. This was the proposed API solution for that:

```
public protocol ViewContentProtocol {
  func events<E: Event>(
    for event: E.Type, on sourceObject: EventSource?,
    componentType: Component.Type?
  ) -> EventSequence<E>
}
extension ViewContentProtocol {
  public func events<E: Event>(
    for event: E.Type, on sourceObject: EventSource? = nil
  ) -> EventSequence<E>
  public func events<E: Event>(
    for event: E.Type, componentType: Component.Type?
  ) -> EventSequence<E>
}
public struct EventSequence<E: Event>: AsyncSequence { }
'''
```

When attempting this implementation, it was discovered that 3D framework event handlers run into issues when scheduled by the Swift async runtime. For example, we could not represent a 3D framework event subscription as an 'AsyncSequence'. This is because when an event is fired 3D framework guarantees that it will suspend execution until the event has been received by all subscriptions. When you 'await' on a value from an 'AsyncSequence', you may receive the value after an indeterminate amount of time (as decided by the 2D framework scheduler). So there would be no way to implement this guarantee. For example, using the current proposed solution:

```
struct RocketComponent: Component {
  private var isLaunched: Bool = false
  private var isInOrbit: Bool = false
  public func launch( ) {
    isLaunched = true
    print("Rocket has launched!")
  }
  public func moveToOrbit( ) {
    precondition(isLaunched) // Will not crash in this example
    isInOrbit = true
    print("Rocket is now orbiting Earth")
  }
}
struct RocketshipSimulator: View {
  @State var state = SimulationState( )
  @State var subscription: EventSubscription?
  var body: some View {
    View { content in
      let rocket = await state.loadRocket( )
      content.entities += rocket
      // Every time a RocketComponent is added, launch the rocket.
      subscription = content.subscribe(to: ComponentEvents.DidAdd.self,
          componentType: RocketComponent.self) { event in
        event.entity.components[RocketComponent.self]!.launch( )
      }
      // launch( ) will be called via the subscription before set( ) returns
      rocket.components.set(RocketComponent( ))
      // moveToOrbit's precondition will pass because launch( ) was called
      rocket.components[RocketComponent.self]!.moveToOrbit( )
    }
  }
}
'''
```

In some examples, techniques describe a 2D framework for hosting custom content within apps on operating system. It is designed to scale to support a variety of use cases for working with content. One key use case that we aim to enable on operating systems is the ability to embed UI within a scene. This is crucial for turning a passive 3D scene into an interactive experience, and for building true volumetric apps on operating systems. A 2D framework is not expected to provide all the tools needed to build rich3D interfaces and content on its own in operating system, and thus a tight integration story between UI built in 2D framework and content authored in 3D framework will be essential to allow developers to explore this space and build a new generation of 3D applications.

In some examples, 3D apps should be able to: Make use of the full suite of UI components, including both informational UI like text and info panels, and interactive controls like buttons and sliders, Place their UI content anywhere in their 3D scene (e.g., pinning a UI panel relative to the selected piece of a 3D model), Automatically get the system-standard look-and-feel for their controls, Support the standard hand-based interaction model on operating system, including indirect touch (gaze-and-pinch), direct touch, and their accessibility variants.

In some examples, a new concept of "attachments" to 3D framework for hosting UI content within its entity hierarchy. Attachments would only be available on operating system at first. Here is a simple example of how attachments are used:

```
struct MyCoolSimulation: View {
  @State var state = SimulationState( )
  enum AttachmentID: Int {
    case button
  }
  var body: some View {
    View { content, attachments in
      content.add(state.modelEntity)
      if let button = attachments.entity(for: AttachmentID.button) {
        button.position = SIMD3(x: 0.25, y: 0.1, z: 0.1)
        content.add(button)
      }
    } attachments: {
      Button("Bigger!", action: {
        state.modelEntity.scale *= 2
      })
      .tag(AttachmentID.button)
    }
  }
}
@Observable
class SimulationState {
  var modelEntity = ModelEntity(mesh: .generateSphere(radius: 0.1))
}
‘‘‘
```

Attachments are declared using the optional 'attachments' ViewBuilder. Each attachment should be given a tag to identify it using the '.tag( )' modifier. Within the view's body, the new 'attachments' parameter provides access to attachment entities via the 'entity(for:)' function, keyed by the attachment view's tag. Because these attachments are vended as entities, the developer can treat them as they would any other content. Note that these entities are *not* automatically added to the entity hierarchy; developers are expected to manage this themselves so that they are consciously placed within the 'view'.

Attachments can be dynamically added and removed from the 'attachments' ViewBuilder, including support for 2D framework transition and animation system. Under the hood, attachments are rendered the same way other 2D framework views are rendered, only with a 3D position based on how the developer places the attachment entities.

attachment entities can also be inspected more directly through the use of the

```
public struct ViewAttachmentComponent: TransientComponent {
  /// The bounding box of the attachment, expressed in meters.
  public var bounds: BoundingBox { get }
  /// The identifier used for this attachment.
  public var id: AnyHashable { get }
}
‘‘‘
```

In some examples, the only properties exposed on 'ViewAttachmentComponent' are: 1. Its bounds, allowing apps to place a attachment relatively based on its size. 2. Its ID, allowing custom Systems to associate the attachment entity with corresponding UI state.

Attachment entities are instances of the new 'ViewAttachmentEntity' class, which provides a more direct, type-safe accessor to the underlying 'ViewAttachmentComponent':

```
public class ViewAttachmentEntity: Entity {
  public var attachment: ViewAttachmentComponent { get }
}
‘‘‘
```

Attachment entities do not expose most of their implementation details, like their underlying meshes or materials. They do not participate in physics collisions by default, though apps can opt them in to physics by manually adding a collider (whose shape must also be calculated manually).

```
@available (mixedrealityOS)
extension View {
/// Creates a 'View'.
///
///—Parameters:
///—'make': A closure that you can use to set up and configure the
/// initial content in your 'View'.
///—'update': An optional closure that you can use to update your
/// 'View''s content in response to changes in your view's
/// state.
///—'attachments': A 'ViewBuilder' of attachment views to use in your
/// 'View''s content. Access entities representing your
/// attachments via the "ViewAttachments" passed in
/// to your 'make' and 'update' closures using the
/// "View Attachments/entity(for:)" function.
///
///—Note: Attachment views are not automatically added to your
/// 'View''s content. Instead, you must explicitly add these
/// entities to the hierarchy. Attachment entities can be placed normally
/// or parented to any other entity. Access details of a attachment
/// entity, like its bounds, using methods on the "ViewAttachmentEntity"
/// type.
```

```
public init<A: View>(
  make: @Sendable @escaping @MainActor
    (inout RealityViewContent, ViewAttachments)
    async -> Void,
  update: (@MainActor (inout ViewContent, ViewAttachments) ->
  Void)? = nil,
  @ViewBuilder attachments: @escaping ( ) -> A
) where Content == AttachmentContent<A, DefaultPlaceholder>
```

/// Creates a ‘View’.

///—Parameters:

///—‘make’: A closure that you can use to set up and configure the

/// initial content in your ‘View’. This closure is ‘async’ to

/// provide a natural place to load any initial state required to

/// display your ‘View’, like a ‘ModelEntity’ loaded from disk.

/// It is strongly recommended to perform all loading operations

/// asynchronously to avoid creating a hang in your app’s UI. While

/// your ‘make’ closure is still evaluating, the ‘placeholder’ view

/// will be displayed instead.

/// ///—‘update’: An optional closure that you can use to update your

/// ‘View’’s content in response to changes in your view’s

/// state.

///—‘attachments’: A ‘Builder’ of attachment views to use in your

/// ‘View’’s content. Access entities representing your

/// attachments via the “ViewAttachments” passed in

/// to your ‘make’ and ‘update’ closures using the

/// “View Attachments/entity(for:)” function.

///—‘placeholder’: A view to display while your ‘View’’s ‘make’

/// closure is being evaluated. For example, you could use a

/// ‘Progress View’ as a loading indicator.

///

///—Note: Attachment views are not automatically added to your

/// ‘View’’s content. Instead, you must explicitly add these

/// entities to the hierarchy. Attachment entities can be placed normally

/// or parented to any other entity. Access details of a attachment

/// entity, like its bounds, using methods on the “ViewAttachmentEntity”

/// type.

```
    public init<A: View, P: View>(
      make: @Sendable @escaping @MainActor
        (inout ViewContent, ViewAttachments)
        async -> Void,
      update: (@MainActor (inout ViewContent, ViewAttachments) ->
      Void)? = nil,
      @ViewBuilder placeholder: ( ) -> P,
      @ViewBuilder attachments: @escaping ( ) -> A
    ) where Content == AttachmentContent<A, P> public typealias
AttachmentContent<A, P> =
      ViewAttachmentContent<A, ViewContent.Body<P>>
  }
```

/// A view that represents the contents of a “View” with attachments.

///

/// You don’t create this type directly. “View” creates values for you.

```
@available(mixedrealityOS)
public struct ViewAttachmentContent<Attachments: View, Content:
View>: View { }
@available(mixedrealityOS)
public struct ViewAttachments {
```

/// Gets the identified attachment view as an entity, if the view with that

/// tag exists.

///

/// Note: resolving a attachment entity does not automatically add it to

/// your “View”’s content. You must add it yourself using a

/// function like “ViewContent/add(_:)”.

///

///—Parameter id: The value that you used to tag the view when you

/// define it in the ‘attachments’ parameter of the “View”

//// initializer “View/init(make: update: attachments:)”.

///—Returns: The resolved attachment entity, or ‘nil’ if “View”

/// can’t find an attachment view with the given ‘id’.

```
  public func entity(for id: some Hashable) -> ViewAttachmentEntity?
}
```

/// A component containing additional information about a view attachment

/// entity provided via the “ViewAttachments/entity (for:)”

/// function.

@available (mixedrealityOS 1.0)

public struct ViewAttachmentComponent: TransientComponent, Identifiable {

/// The bounding box of the view attachment, expressed in meters.

public var bounds: BoundingBox {get}

/// The identifier used for this view attachment.

```
        public var id: AnyHashable { get }
      }
```

/// An entity that has a view attachment.

@available (OS)

```
  public class ViewAttachmentEntity: Entity {
    /// The view attachment component for this entity.
    public var attachment: ViewAttachmentComponent { get }
  }
  ```
```
```

Below are a couple of complete examples on how attachments can be used. First, a view that asynchronously loads a robot model and adds a button anchored to its left hand:

```
struct InteractiveRobotExample: View {
  @State var state = SimulationState( )
  enum AttachmentID: Int {
    case button
  }
  var body: some View {
    RealityView { content, attachments in
      await state.load( )
      guard let robot = state.robot else { return }
      content.add(robot)
      if let button = attachments.entity(for: AttachmentID.button),
        let hand = robot.findEntity(named: "left__hand")
      {
        // place the button to the left of the hand
        button.position.x = button.bounds.max.x − 0.05
        hand.addChild(button)
      }
    } placeholder: {
      ProgressView( )
    } attachments: {
      Button("Wave!", action: state.wave)
        .tag(AttachmentID.button)
    }
  {
  @Observable
  class SimulationState {
    var robot: ModelEntity?
    func load( ) async {
      guard robot == nil else { return }
      robot = try? await ModelEntity(named: "robot")
    }
}
    func wave( ) {
      if let robot, let animation = robot.availableAnimations
        .first(where: { $0.name == "wave" })
      {
        robot.playAnimation(animation)
      }
    }
  }
}
‘‘‘
```

Second, a view displaying a dynamic set of shapes, with UI to add new shapes and delete each shape:

```
struct InteractiveShapesExample: View {
  @State var state = SimulationState( )
  var body: some View {
    VStack {
      GeometryReader3D { geometry in
        simulationContent(in: geometry)
      }
      Button("Add Shape", action: state.addShape)
    }
  }
func simulationContent(in geometry: GeometryProxy3D) −> some View {
    RealityView { __ in
      // empty to start
    } update: { content, attachments in
      // Add any new shapes to the hierarchy
      for (id, shape) in state.shapes where shape.parent == nil {
        content.add(shape)
        let position = Point3D(
          x: .random(in: 0...1), y: .random(in: 0...1),
          z: .random(in: 0...1)
        ) * Point3D(geometry.size)
        shape.position = content.convert(position, from: .local)
```

-continued

```
        if let delete = attachments.entity(for: id) {
          shape.addChild(delete)
        }
      }
    } attachments: {
ForEach(state.shapeIDs, id: \.self) { id in
        Button(action: { state.removeShape(id) }) {
          Image(systemName: "xmark")
        }.tag(id)
      }
    }
  }
  @Observable
  class SimulationState {
    private var counter = 0
    var shapes = [Int: ModelEntity]( )
    var shapeIDs: [Int] { shapes.keys.sorted( ) }
    func addShape( ) {
      let shape = ModelEntity(
        mesh: .generateSphere(radius: Float.random(in: 0.1...0.4)),
        materials: [UnlitMaterial(color: randomColor( ))])
      shape.generateCollisionShapes(recursive: true) // make it
      hit-testable
      shapes[counter] = shape
      counter += 1
    }
    func removeShape(__ id: Int) {
      if let shape = shapes[id] {
        shape.removeFromParent( )
        shapes[id] = nil
      }
    }
    private func randomColor( ) −> UIColor {
      .init(
        hue: .random(in: 0...1),
        saturation: .random(in: 0.5...1),
        brightness: 1, alpha: 1)
    }
  }
}
‘‘‘
```

Attachments are designed to be high-level and abstract away many of its implementation details. It is thus flexible and can be implemented in one of several ways, and can change over time as needed. However, to fully understand this proposal it can be useful to review the current direction for its implementation on Operating System.

When the developer provides a attachment view to ‘View’, a *proxy* entity will be created for that view. That entity is what is provided to the ‘View’’s body via the ‘attachments.entity (for:)’ function. The developer can parent that entity within their hierarchy and position it as they see fit. However, the underlying 2D framework content for this attachment is not directly parented to this proxy entity. Instead, ‘View’ maintains a shallow hierarchy of attachment views, parenting them directly to the ‘View’. It then tracks the transforms of the corresponding proxy entities to keep in sync with the actual positions of those attachment views. To maintain good performance, updates to attachment view positions are coalesced into a single transaction.

However, there are some implications to consider:* Apps cannot directly introspect the entity or layer hierarchy of the attachment entity. We view this as a benefit, as it reduces developer temptation to try and mess with that hierarchy in ways that will break over time. Attachment entities do not participate in physics collisions by default, and apps must manually calculate their colliders using the ‘ViewAttachmentComponent’’s bounds. (The latter could also be solved via smarter integration with ‘Entity.generateCollisionShapes( )’.) Certain hierarchical effects in 3D framework, like 3D clipping, would require an alternate means to propagate correctly, likely using a server-side mechanism. Such mechanisms already exist internally, but would need to be generalized to use with attachment entities. Note that there are currently no hierarchical effects as public API in 3D framework (and only a few as SPI), but this may one day change.

</details>

A component-based approach is the leading alternative candidate, as it fits the most neatly into existing design patterns. This would work similarly to the API for UICollection View interop, and could look like so:

```
struct MyCoolSimulation: View {
  @StateObject var state = SimulationState( )
  var body: some View {
    View { content in
      content.add(state.modelEntity)
      let button = Entity( )
      button[UIHostingComponent.self] = UIHostingComponent {
        Button("Bigger!", action: {
          state.modelEntity.scale *= 2
        })
      }
      button.position = SIMD3(x: 0.25, y: 0.1, z: 0.1)
      content.add(button)
    }
  }
}
class SimulationState: ObservableObject {
  var modelEntity = ModelEntity(mesh: .generateSphere(radius: 0.1))
}
```
```

While this approach is more convenient in some ways, it presents some significant challenges:* It is *much* harder to implement. It requires that we support the use of a fully heterogeneous and nesting 2D frame work-3D framework hierarchy. This means that all UI framework features, like propagating the environment and preferences, coordinate conversions, gestures and hit testing, and so on must learn to work with this mixed entity-layer hierarchy. Doing so breaks many assumptions held in frameworks throughout the stack, and adds significant complexity to 2D frameworks and 3D frameworks to implement properly. We have attempted to do this before, and learned the hard way just how much of an added burden this places on our frameworks. Teaching 2D framework to interoperate smoothly in a heterogeneous hierarchy is already a massive implementation burden on 2D framework; while supporting this was a necessary and worthwhile tradeoff for 2D framework to take on at the time, we have more freedom with 3D framework to choose a different and simpler path. The aforementioned implementation burden is needed to support things like the environment propagating to entities within a 'View' that use a 'UIHostingComponent', or gestures within that 'UIHostingComponent' composing correctly with gestures from above in the hierarchy. These API promises must be upheld for 'UIHostingComponent' to support the full feature set of a 2D framework, and thus the implementation burden must be maintained long-term as well.

2D framework and 3D framework go hand in hand on operating system. The system is built from the ground up with 3D framework as a foundation by leveraging advanced 3D rendering techniques, deep integration with animations, and powerful simulation systems. Similarly, input on the operating system relies on 3D framework for 3D ray casting and collision detection. However, the bulk of this work has focused on extending existing gestures into 3D.

Because of this work, OS supports all the standard gestures vended by 2D frameworks. Techniques herein offer more expressive 3D support through extensions to existing gesture values like a 'location3D' property on 'DragGesture'. The introduction of 'View' offers a powerful jumping off point from 2D framework into 3D framework. 2D framework integration can now host an arbitrary hierarchy, and we imagine developers will use this API to add a wide range of 3D functionality into their applications, from small flourishes of 3D in a primarily windowed app, all the way to fully immersive VR applications built almost entirely within 3D framework.

3D framework's prominence on OS demands additional support from the gesture system. As applications lean more heavily on 'View', they begin to lose the ability to build interactions using 2D framework gesture system since 'View' is somewhat opaque from 2D framework perspective. Similar to 'Canvas', it's not the case that every targetable item inside of 3D framework is mapped 1-1 with a 'View', which is where 2D gestures must be attached. Because of this, developers are incentivized to drop down to virtual kits for low level hand data to build their own custom interaction and hit testing systems. And because we are not exposing gaze data to applications, it is simply not possible to implement a wide range of interactions that are supported in 2D frameworks because of their deeper integration with the render server.

To bring the power of 2D gestures to 'View' content a gesture modifier named 'targetedToEntity' that allows the developer to associate a gesture with the primary entity targeted by the 'Gesture'. The gesture's values, including [the new extensions to existing gestures] are modified to append the targeted entity and adds the ability to convert the gesture's spatial data between 2D and 3D coordinate spaces by leveraging the new 'RealityCoordinateSpaceConverting' protocol. The gesture is also failed if it targets non-3D framework content, or if it targets the _wrong_3D framework content, which we'll see in some of the examples below.

In this example, a sphere within a 'View' is able to receive input and activate a 'SpatialTapGesture' when tapped. The tap location is converted into the coordinate space of the sphere and used to place a new child sphere at that location.

```
struct SpatialTapSphere: View {
  var body: some View {
    View { content in
      let sphere = ModelEntity(
        mesh: .generateSphere(radius: 0.1),
        materials: [SimpleMaterial(color: .blue, roughness: 0.25,
        isMetallic: false)],
        collisionShape: .generateSphere(radius: 0.1),
        mass: 1
      )
      sphere.physicsBody!.mode = .static
      sphere.components.set(InputTargetComponent( ))
      content.add(sphere)
    }
    .gesture(SpatialTapGesture( ).targetedToAnyEntity( ).onEnded {
    value in
      // Convert the drag location from 2D local space of the 3D
      // to the targeted entity's local space.
      let tapPoint = value.convert(
        value.location3D,
        from: .local,
        to: value.entity
      )
      // Create a sphere at the tap location and add it as a child of the
      // targeted entity.
      let newEntity = ModelEntity(mesh: .generateSphere(radius: 0.01),
```
```

-continued

```
        materials: [SimpleMaterial(color: .red, roughness: 0.25,
        isMetallic: false)])
      newEntity.position = tapPoint
      entity.addChild(newEntity)
    })
  }
}
```
```

In the above example, 'targetedToAnyEntity( )' means that the modified gesture should only activates if it is operating on any 'Entity'. We also propose allowing the developer to specify a particular 'Entity' to restrict the modified gesture. For example, a developer could add a 'MagnifyGesture' to the whole 'View' while having a 'DragGesture' only trigger when operating on a specific entity or any entity downstream from it using 'targetedToEntity(entity)':

```
```swift
struct ArcadeCabinet: View {
  @GestureState var dragLocation: Point3D = .zero
  @GestureState var inProgressScaleFactor: CGFloat = 1
  @State var cabinetScale: CGFloat = 1
  let joystick: Entity = makeJoystickEntity( )
  var body: some View {
    RealityView { content in
      let screen = ScreenEntity( )
      let cabinet = CabinetEntity( )
      let redButton = ArcadeButtonEntity(.red)
      let greenButton = ArcadeButtonEntity(.green)
      joystick.setParent(cabinet)
      redButton.setParent(cabinet)
      greenButton.setParent(cabinet)
      screen.setParent(cabinet)
      // Position different parts of the arcade cabinet, etc
      // Add the cabinet entity to the RealityView.
      content.add(cabinet)
    } update: { content in
      joystick.updateRotationWithDragLocation(dragLocation))
    }
    // Create a 'DragGesture' that only triggers if the 'joystick' entity
    // is targeted.
    .gesture(DragGesture(coordinateSpace: .global)
      .targetedToEntity(joystick)
      .updating($dragLocation) { value, state, _ in
        state = value.convert(value.location3D,
          from: .global, to: joystick.parent)
      }
    )
    .gesture(MagnifyGesture( )
      .targetedToEntity( )
      .updating($inProgressScaleFactor) { value, state, _ in
        state = value.magnification
      }.onEnded { value in
        cabinetScale *= inProgressScaleFactor
      }
    )
  }
}
```
```

Because we're using the 2D gesture system, the two 'gesture' modifiers create exclusive gesture relationships by default. If the user drags on the joystick entity, the DragGesture' will activate and cause 'dragLocation' to update, in turn causing the 'update' block

of the 'View' to run. During the drag, the 'MagnifyGesture' would not be allowed to begin. On the other hand if the user dragged on an entity other than the joystick, no gesture would trigger until a second hand starts dragging, at which point the 'MagnifyGesture' would trigger, resulting in scaling the arcade cabinet entity.

In addition to targeting specific entities, a 'targetedToEntity(where: QueryPredicate<Entity>)' which filters to only entities that are included in the results of the QueryPredicate passedin.

myView.gesture(RotateGesture3D( ).targetedToEntity (where: .has(MyRotatableComponent.self))

```
// A custom component to store some kind of rotation, ostensibly applied
// to the entity in a custom system.
struct MyRotatableComponent: Component {
  var rotation: Rotation3D
  var isEnabled: Bool
  ...
}
```
```

In this example only entities with the 'MyRotatableComponent', which is a developer-defined custom component, can be targeted by the 'RotateGesture3D'.

extension Gesture {

/// Require this gesture to target an entity.

///

///—Returns: A 'RealityCoordinateSpaceConverting' value containing

/// the original gesture value along with the targeted entity.

public func targetedToAnyEntity ( )→some Gesture<EntityTarget Value<Self.Value>>

/// Require this gesture to target 'entity' or a descendant of 'entity'.

///

///—Parameter entity: The entity the gesture should target.

///

///—Returns: A 'RealityCoordinateSpaceConverting' value containing

/// the original gesture value along with the targeted entity.

public func targetedToEntity (_entity: Entity)→some Gesture<Entity Target Value<Self.Value>>

/// Require this gesture to target an entity that can be found in the results of the specified QueryPredicate

///

///—Parameter query: a 'QueryPredicate<Entity>' to filter which entity the gesture should target

///

///—Returns: A 'RealityCoordinateSpaceConverting' value containing

/// the original gesture value along with the targeted entity.

public func targetedToEntity (where query: QueryPredicate<Entity>)→some Gesture<EntityTarget Value<Self.Value>>}

}

/// A value containing an original gesture value along with a targeted entity.

/// Spatial data from 'Value' can be converted to and from the entity

/// using functions defined in 'RealityCoordinateSpaceConverting'.

///

/// For example, to convert a 'DragGesture''s 'location3D' to 'entity''s

/// parent:

///

III DragGesture (coordinateSpace: .global).targetedToEntity( ).updating ($state) {state, value, _in /// let location=value.convert( /// value.location3D, from: .global, to: value.entity.parent

/// )

/// . . .

///}

@dynamicMemberLookup public struct EntityTargetValue<Value>: RealityCoordinateSpaceConverting {

/// The gesture value updated by the gesture.

public var var gesture Value: Value

/// The targeted entity.

```
public var entity: Entity
  subscript<T>(dynamicMember keyPath: KeyPath<Value, T>) -> T
}
extension EntityTargetValue: Equatable where Value: Equatable {
  public static func == (lhs: EntityTargetValue<Value>,
    rhs: EntityTargetValue<Value>) -> Bool
}
‘‘‘
```

For support on other platforms, the 'targetedToEntity' modifier can provide similar functionality in 'View' as it does on OS. However, because gestures on those platforms are fundamentally 2D, it's likely that we would want 'EntityTargetValue' to assist with converting spatial data differently, for example by projecting 2D locations into the 3D scene.

For this, we could have a 'RealityCoordinateSpaceProjectible' protocol and have 'EntityTarget Value' conform to that on 2D platforms.

```
protocol RealityCoordinateSpaceProjectible {
  func project(
    _ point: CGPoint, from space: CoordinateSpace,
    to entity: Entity? = nil
  ) -> SIMD3<Float>
  func unproject(
    _ point: SIMD3D<Float>, from entity: Entity? = nil,
    to space: CoordinateSpace
  ) -> CGPoint
}
‘‘‘
```

n the original version of this proposal, 'targetedToEntity' had two variants, a version that took an 'Entity?' and a version that took a particular 'Component.Type' like so:

extension Gesture {

/// Require this gesture to target an entity, or a descendant of an entity,

/// in order to activate.

///

///—Parameter entity: An entity that must be targeted by the gesture

/// in order to activate. If 'nil' is specified, then the gesture

/// activates if it targets any 'Entity'.

///

///—Returns: A 'RealityCoordinateSpaceConverting' value containing

/// the original gesture value along with the targeted entity.

public func targetedToEntity (_entity: Entity?=nil)

>some Gesture<EntityTarget Value<Self.Value>>

/// Require this gesture to target an entity that has the specified

/// component type attached.

///

///—Parameter component: A component type used to filter the potential

/// targets for this gesture.

///

///—Returns: A 'RealityCoordinateSpaceConverting' value containing

/// the original gesture value along with the targeted entity.

public func targetedToEntity<RestrictedComponent: Component>( having component: RestrictedComponent.Type )→some Gesture<EntityTarget Value<Self.Value>>

}

'''

We determined it was confusing to have an optional 'Entity' where 'nil' means "any entity".

Rather than exposing a new variant of 'targetedToEntity' like 'targetedToAnyEntity', we think the explicit modeling of the filter using the 'QueryPredicate<Entity>type' makes it easier to understand the various possible filtering behaviors, especially for those already familiar with 3D framework.

One alternative is to implement these behaviors using a new gesture called 'EntityGesture' whose value would be similar to 'EntityTarget Value'. It was determined that this version of the API is harder to read and easier to get wrong (it's rather easy to put the 'onChanged' on the 'DragGesture' instead of the 'EntityGesture<DragGesture>'.

```
struct EntityGestureDemoView: View {
  var body: some View {
    View { content in
      ...
    } update: { _ in }
    .gesture(EntityGesture(DragGesture( )).onChanged { event in
      ...
    })
  }
}
```
```

In some examples, since 'QueryPredicate' already existed, it would be better for API continuity and cleanliness to use a system that was already in place, rather than building a new one. If we built out 'GestureEntityTarget' it would have looked something like this:

''' swift

/// A filter on a 'Gesture''s targeted 'Entity'. If the filter

/// rejects a 'Gesture''s entity, then the 'Gesture' does not activate and fails immediately.

public struct GestureEntityTarget {

/// A filter that requires a 'Gesture' to target any 'Entity'.

/// If the gesture does not target an 'Entity', the 'Gesture' fails.

static var any: GestureEntityTarget {get}

/// A filter that requires a 'Gesture' to target 'entity' or a descendant of 'entity'.

static func descendingFrom (_entity: Entity)→GestureEntityTarget

/// A filter that requires a 'Gesture' to target an 'Entity' that has a component /// of type 'componentType'. If 'includingAncestors' is true, then the 'Gesture' may /// activate if any ancestor 'Entity' of the targeted 'Entity' has a component of type 'component Type'.

static func withComponent(_componentType: any Component.Type, includingAncestors: Bool=true)→GestureEntityTarget
```

/// A filter that allows a 'Gesture' to activate only if 'filter' returns 'true'
/// given the 'Entity' targeted by the 'Gesture'.
static func filter (_filter: @escaping (Entity)→Bool) →GestureEntityTarget
}
'''

There are a number of use cases for converting between 2D and 3D content in an app. For example, use of the new 'GeometryReader3D' can inform a child 'View' about the available space it has to configure its 'Entity' hierarchy like so:

```
GeometryReader3D { proxy3D in
  View { content in
    let frameInPoints = proxy3D.frame(in: .local)
    let sizedEntity = MyCoolModel(boundingBox: frameInPoints)
    content.add(sizedEntity)
  }
}
'''
```

In this example, 'MyCoolModel' takes a size in order to figure out how large to make itself. However, the frame we get from 'GeometryReader3D' is in points so that it can be useful in non-3D contexts as well. This leaves a gap in usefulness, as it's highly likely that 'MyCoolModel' would prefer to deal with coordinates in the coordinate space of the 'View''s 3D content itself.

Additionally, 2D gestures on 'View' content have similar needs. The new 'targetedToEntity' Gesture modifier allows a 2D gesture to gate its activation on whether it targets an entity. However, in order for the gesture to be useful in the context of 'View', the developer needs a way to convert spatial data into the coordinate space of an 'Entity' inside the View.

This proposal aims to solve both these problems, among other similar ones related to conversions between 2D and 3D coordinate spaces.

In some examples, there are two new protocols, 'RealityCoordinateSpace', and 'RealityCoordinateSpaceConverting', to make it easy to convert spatial data between 2D and 3D coordinate spaces. Conformance to 'RealityCoordinateSpace' means that a 'RealityCoordinateSpaceConverting' is able to convert properties to and from a '2D' coordinate space to the conformer. This protocol would have an underscored method so that we can add conformance to types internally and not allow conformance of arbitrary types.

'ViewInlineContent' would be an example of something that would conform so that the developer has a way to convert data to and from the root of their View.

Additionally, to handle immersive VR cases where the developer is dealing with content directly at the root of their volumetric window or 'Stage', a 'RealityCoordinateSpace.scene' static property representing the '3D framework' 'Scene'. This allows for easy conversions to and from a coordinate space aligned with ARKit's world anchor tracking and hand anchor APIs. Having 'RealityCoordinateSpace' allows us to avoid ambiguity about what converting to and from 'nil' means across different contexts.

In the proposal for "2D Gestures in View", using these new protocols with the new 'targetedToEntity' Gesture modifier. For example, the developer could convert a 3D location from a 'SpatialTapGesture' into a View's entity hierarchy like so:

```
struct SpatialTapSphere: View {
  var body: some View {
    View { content in
      let sphere = ModelEntity(
        mesh: .generateSphere(radius: 0.1),
        materials: [SimpleMaterial(color: .blue, roughness: 0.25,
        isMetallic: false)],
        collisionShape: .generateSphere(radius: 0.1),
        mass: 1
      )
      sphere.physicsBody!.mode = .static
      sphere.components.set(InputTargetComponent( ))
      content.add(sphere)
    }
    .gesture(SpatialTapGesture( ).targetedToEntity( ).onEnded { value in
      // Convert the drag location from 2D local space of the View
      // to the targeted entity's local space.
      let tapPoint = value.convert(
        value.location3D,
        from: .local,
        to: value.entity
      )
      // Create a sphere at the tap location and add it as a child of the
      // targeted entity.
      let newEntity = ModelEntity(mesh: .generateSphere(radius: 0.01),
        materials: [SimpleMaterial(color: .red, roughness: 0.25,
        isMetallic: false)])
      newEntity.position = tapPoint
      entity.addChild(newEntity)
    })
  }
}
'''
```

As mentioned in the Motivation section, this protocol would make 'GeometryReader3D' useful for determining how much space a 'View' has to lay out its 3D content:

```
'''swift
GeometryReader3D { proxy3D in
  RealityView { content in
    // Get the 3D frame size in points
    let frameInPoints = proxy3D.frame(in: .local)
    let boundingBoxInMeters = content.convert(sizeInPoints, from:
    .local, to:
     let sizedEntity = MyCoolModel(boundingBox:
    boundingBoxInMeters)
    content.add(sizedEntity)
  }
}
'''
'''swift
```

/// A 3D coordinate space that exists within a hierarchy.
/// Any 'RealityCoordinateSpaceConverting' can convert spatial data between
/// 2D 'CoordinateSpace's and 'RealityCoordinateSpace's.
public protocol RealityCoordinateSpace {
// Internal implementation, making this protocol not publicly conformable.

```
    func _resolve(in context: _RealityCoordinateSpaceContext) ->
_ResolvedRealityCoordinateSpace
  }
```

// Internal coordinate space implementation details.
public struct_ResolvedRealityCoordinateSpace { }
// Internal coordinate space implementation details.
public struct_RealityCoordinateSpaceContext { }
public extension Entity: RealityCoordinateSpace { }
/// The root coordinate space of the 3D.

public extension RealityViewInlineContent: RealityCoordinateSpace, RealityCoordinateSpaceConverting { }

/// Root coordinate space of the 3D 'Scene'.

```
extension RealityCoordinateSpace where Self == SceneCoordinateSpace {
  public static var scene: Self
}
```

/// The 'RealityCoordinateSpace' representing the root 'Scene' coordinate space.

public struct SceneCoordinateSpace: RealityCoordinateSpace { }

/// A value that can be converted between 2S 'CoordinateSpace's and public protocol RealityCoordinateSpaceConverting {

/// Convert a 3D point from a 2D 'CoordinateSpace' to an entity.

```
    func convert(
      _ point: Point3D,
      from space: CoordinateSpace,
      to realitySpace: some RealityCoordinateSpace
    ) -> SIMD3<Float>
```

/// Convert a 3D point from an entity to a 2D 'CoordinateSpace'.

```
    func convert(
      _ point: SIMD3<Float>,
      from realitySpace: some RealityCoordinateSpace,
      to space: CoordinateSpace
    ) -> Point3D
```

/// Convert a 3D rect from a 2D 'CoordinateSpace' to an entity.

```
    func convert(
      _ rect: Rect3D,
      from space: CoordinateSpace,
      to realitySpace: some RealityCoordinateSpace
    ) -> BoundingBox
```

/// Convert a 'BoundingBox' from an entity to a 2D 'CoordinateSpace'.

```
    func convert(
      _ boundingBox: BoundingBox,
      from realitySpace: some RealityCoordinateSpace,
      to space: CoordinateSpace
    ) -> Rect3D
```

/// Convert a 3D transform from a 2D 'CoordinateSpace' to an entity.

```
    func convert(
      _ transform: AffineTransform3D,
      from space: CoordinateSpace,
      to realitySpace: some RealityCoordinateSpace
    ) -> Transform
```

/// Convert a 3D transform from an entity to a 2D 'CoordinateSpace'.

```
    func convert(
      _ transform: Transform,
      from realitySpace: some RealityCoordinateSpace,
      to space: CoordinateSpace
    ) -> AffineTransform3D
  }
  ‛‛‛
```

On other platforms, spatial data is fundamentally 2D. For both the 'targetedToEntity' and 'View' use cases, we'd likely want a different way to convert spatial data to and from 3D framework. For example, one could expose a 'RealityCoordinateSpaceProjectible' that could project and unproject 2D data

```
protocol RealityCoordinateSpaceProjectible {
  func project(
    _ point: CGPoint, from space: CoordinateSpace,
    to realityCoordinateSpace: some RealityCoordinateSpace
  ) -> SIMD3<Float>
  func unproject(
    _ point: SIMD3D<Float>,
    from realityCoordinateSpace: some RealityCoordinateSpace,
    to space: CoordinateSpace
  ) -> CGPoint
}
‛‛‛
```

To help with consistency, one could replace the existing conversion functions between 'Entity' instances with functions defined by 'RealityCoordinateSpaceConverting'. This might also resolve ambiguity about what 'nil' means in those conversion functions.

Without a static '.scene' property, it would likely still be possible to convert values to and from a "root" scene space, but it would be more difficult, requiring the developer to create an 'Entity' that tracks the identity transform relative to its place in the hierarchy, which could be invalidated if the 'View' containing it moves.

Without a unified solution for 3D layout, and 'targetedToEntity', each of these solutions would likely need to expose their own APIs for similar kinds of conversions between 2D and 3D contexts. This will likely be overwhelming to developers.

As described above, one aspect of the present technology is the gathering and use of data available from specific and legitimate sources for providing content. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of techniques for rendering content, the present technology can be configured to allow users to select to “opt in” or “opt out” of participation in the collection and/or sharing of personal information data during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
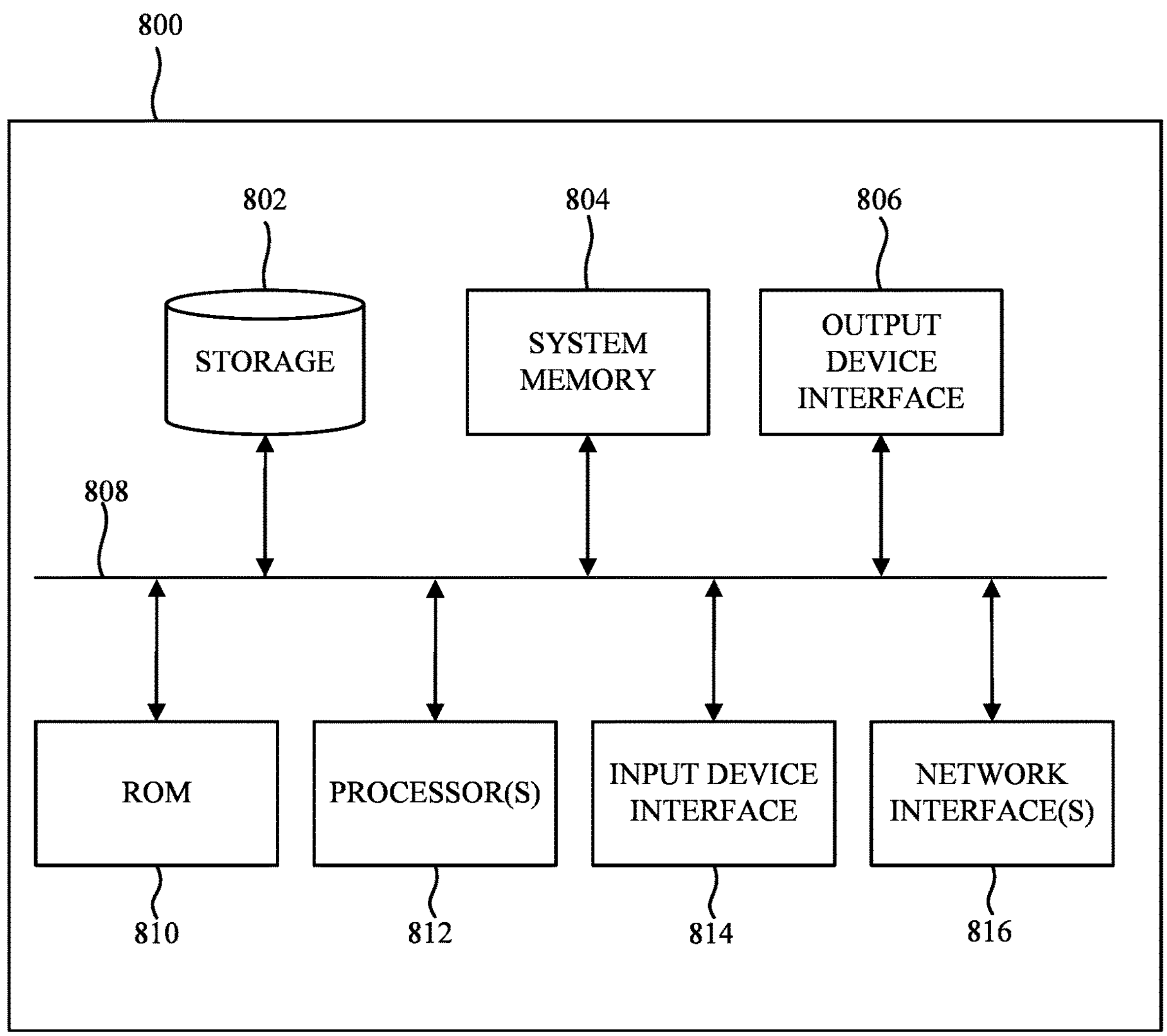
FIG. 8 illustrates an electronic system with which some examples of the subject technology may be implemented.

FIG. 8 illustrates an electronic system 800 with which some examples of the subject technology may be implemented. The electronic system 800 can be, and/or can be a part of, the electronic device 105, the handheld electronic device 104, the electronic device 110, the electronic device 115, and/or the server 120 as shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In some examples, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different examples.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In some examples, a mass-storage device (such as a magnetic or optical disk and its corresponding disk drive) may be used as the permanent storage device 802.

In some examples, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In some examples, the processes of the subject disclosure are stored in the system memory 804, the permanent storage device 802, and/or the ROM 810 (which are each implemented as a non-transitory computer-readable medium). From these various memory units, the one or more processing unit(s) 812 retrieves instructions to execute and data to process in order to execute the processes of some examples.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called “cursor control devices”). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. Some examples may include devices that function as both input and output devices, such as a touchscreen. In these examples, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some examples include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some examples are performed by one or more integrated circuits, such as application specific integrated circuits (ASICs) or field programmable gate arrays (FPGAs). In some examples, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, some examples of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an example of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Some examples within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some examples, the tangible computer-readable storage medium can be directly coupled to a computing device, while in other examples, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, some examples are performed by one or more integrated circuits, such as ASICs or FPGAs. In some examples, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In some examples, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In some examples, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more examples, some examples, other examples, such examples, one example, for example, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other examples. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
at a computer system in communication with one or more input devices:
detecting, via the one or more input devices, a first input corresponding to a three-dimensional environment;
in response to detecting the first input corresponding to the 3D environment:
in accordance with a determination that a first set of one or more criteria is satisfied, wherein the first set of one or more criteria includes a criterion that is satisfied when the first input is a first type of input and a criterion that is satisfied when the first input is directed to a first entity of a first type in the 3D environment:
translating the first input to a second input different from the first input; and
sending, to a first application, an indication of the second input;
in accordance with a determination that a second set of one or more criteria is satisfied, wherein the second set of one or more criteria includes a criterion that is satisfied when the first input is directed to a second entity of a second type in the 3D environment, sending, to a second application, an indication of the first input, wherein the second type of entity is different from the first type of entity, and wherein the second set of one or more criteria is different from the first set of one or more criteria; and
in accordance with a determination that the first set of one or more criteria and the second set of one or more criteria are not satisfied, sending, to the first application, the indication of the first input.

2. The method of claim 1, wherein an observable representation of the first entity of the first type is not present in the 3D environment.

3. The method of claim 1, wherein an observable representation of the first entity of the second type is present in the 3D environment.

4. The method of claim 1, wherein the first input includes a 3D gesture.

5. The method of claim 4, wherein the first input includes an air gesture.

6. The method of claim 1, wherein the first input includes a gaze of a user directed to a location in the 3D environment.

7. The method of claim 1, further comprising:
detecting a third input corresponding to the 3D environment, wherein the third input is separate from the first input; and
in response to detecting the third input corresponding to the 3D environment:
in accordance with a determination that a fourth set of one or more criteria is satisfied, wherein the fourth set of one or more criteria includes a criterion that is satisfied when the third input is directed to a third entity of a third type in the 3D environment, sending, to a fourth application, an indication of a location corresponding to a first type of coordinate space for the third input, an orientation corresponding to the first type of coordinate space for the third input, a pose corresponding to the first type of coordinate space for the third input, a magnitude corresponding to the first type of coordinate space for the third input, or any combination thereof, wherein the first type of coordinate space is defined by the fourth application; and
in accordance with a determination that a fifth set of one or more criteria is satisfied, wherein the fifth set of one or more criteria includes a criterion that is satisfied when the third input is directed to a fourth entity of a fourth type in the 3D environment, sending, to the fourth application, an indication of a location corresponding to a second type of coordinate space for the third input, an orientation corresponding to the second type of coordinate space for the third input, a pose corresponding to the second type of coordinate space for the third input, a magnitude corresponding to the second type of coordinate space for the third input, or any combination thereof, wherein the second type of coordinate space is defined by the fourth application, wherein the fifth set of one or more criteria is different from the fourth set of one or more criteria, wherein the fourth type of entity is different from the third type of entity, and wherein the second type of coordinate space is different from the first type of coordinate space.

8. The method of claim 1, wherein the second application is the first application.

9. The method of claim 1, wherein the second input includes a two-dimensional representation of the first input.

10. The method of claim 9, wherein translating the first input to the second input includes modifying a representation of a respective input from having six degrees of freedom to two degrees of freedom.

11. A non-transitory computer-readable storage medium storing one or more programs configured to be executed by one or more processors of a computer system in communication with one or more input devices, the one or more programs including instructions for:
detecting, via the one or more input devices, a first input corresponding to a three-dimensional environment;
in response to detecting the first input corresponding to the 3D environment:
in accordance with a determination that a first set of one or more criteria is satisfied, wherein the first set of one or more criteria includes a criterion that is satisfied when the first input is a first type of input and a criterion that is satisfied when the first input is directed to a first entity of a first type in the 3D environment:
translating the first input to a second input different from the first input; and
sending, to a first application, an indication of the second input;
in accordance with a determination that a second set of one or more criteria is satisfied, wherein the second set of one or more criteria includes a criterion that is satisfied when the first input is directed to a second entity of a second type in the 3D environment, sending, to a second application, an indication of the first input, wherein the second type of entity is different from the first type of entity, and wherein the second set of one or more criteria is different from the first set of one or more criteria; and in accordance with a determination that the first set of one or more criteria and the second set of one or more criteria are not satisfied, sending, to the first application, the indication of the first input.

12. The non-transitory computer-readable storage medium of claim 11, wherein an observable representation of the first entity of the first type is not present in the 3D environment.

13. The non-transitory computer-readable storage medium of claim 11, wherein an observable representation of the first entity of the second type is present in the 3D environment.

14. The non-transitory computer-readable storage medium of claim 11, wherein the first input includes a 3D gesture.

15. The non-transitory computer-readable storage medium of claim 14, wherein the first input includes an air gesture.

16. The non-transitory computer-readable storage medium of claim 11, wherein the first input includes a gaze of a user directed to a location in the 3D environment.

17. The non-transitory computer-readable storage medium of claim 11, wherein the instructions further cause the one or more processors to:

detect a third input corresponding to the 3D environment, wherein the third input is separate from the first input; and in response to detecting the third input corresponding to the 3D environment:

in accordance with a determination that a fourth set of one or more criteria is satisfied, wherein the fourth set of one or more criteria includes a criterion that is satisfied when the third input is directed to a third entity of a third type in the 3D environment, sending, to a fourth application, an indication of a location corresponding to a first type of coordinate space for the third input, an orientation corresponding to the first type of coordinate space for the third input, a pose corresponding to the first type of coordinate space for the third input, a magnitude corresponding to the first type of coordinate space for the third input, or any combination thereof, wherein the first type of coordinate space is defined by the fourth application; and in accordance with a determination that a fifth set of one or more criteria is satisfied, wherein the fifth set of one or more criteria includes a criterion that is satisfied when the third input is directed to a fourth entity of a fourth type in the 3D environment, sending, to the fourth application, an indication of a location corresponding to a second type of coordinate space for the third input, an orientation corresponding to the second type of coordinate space for the third input, a pose corresponding to the second type of coordinate space for the third input, a magnitude corresponding to the second type of coordinate space for the third input, or any combination thereof, wherein the second type of coordinate space is defined by the fourth application, wherein the fifth set of one or more criteria is different from the fourth set of one or more criteria, wherein the fourth type of entity is different from the third type of entity, and wherein the second type of coordinate space is different from the first type of coordinate space.

18. The non-transitory computer-readable storage medium of claim 11, wherein the second application is the first application.

19. The non-transitory computer-readable storage medium of claim 11, wherein the second input includes a two-dimensional representation of the first input.

20. The non-transitory computer-readable storage medium of claim 19, wherein translating the first input to the second input includes modifying a representation of a respective input from having six degrees of freedom to two degrees of freedom.

21. A computer system in communication with one or more input devices, comprising:

one or more processors; and memory storing one or more programs configured to be executed by the one or more processors, the one or more programs including instructions for:

detecting, via the one or more input devices, a first input corresponding to a three-dimensional environment;

in response to detecting the first input corresponding to the 3D environment:

in accordance with a determination that a first set of one or more criteria is satisfied, wherein the first set of one or more criteria includes a criterion that is satisfied when the first input is a first type of input and a criterion that is satisfied when the first input is directed to a first entity of a first type in the 3D environment:

translating the first input to a second input different from the first input; and sending, to a first application, an indication of the second input; and in accordance with a determination that a second set of one or more criteria is satisfied, wherein the second set of one or more criteria includes a criterion that is satisfied when the first input is directed to a second entity of a second type in the 3D environment, sending, to a second application, an indication of the first input, wherein the second type of entity is different from the first type of entity, and wherein the second set of one or more criteria is different from the first set of one or more criteria; and in accordance with a determination that the first set of one or more criteria and the second set of one or more criteria are not satisfied, sending, to the first application, the indication of the first input.

22. The computer system of claim 21, wherein an observable representation of the first entity of the first type is not present in the 3D environment.

23. The computer system of claim 13, wherein an observable representation of the first entity of the second type is present in the 3D environment.

24. The computer system of claim 21, wherein the first input includes a 3D gesture.

25. The computer system of claim 24, wherein the first input includes an air gesture.

26. The computer system of claim 21, wherein the first input includes a gaze of a user directed to a location in the 3D environment.

27. The computer system of claim 21, wherein the instructions further cause the one or more processors to:

detect a third input corresponding to the 3D environment, wherein the third input is separate from the first input; and in response to detecting the third input corresponding to the 3D environment:

in accordance with a determination that a fourth set of one or more criteria is satisfied, wherein the fourth set of one or more criteria includes a criterion that is satisfied when the third input is directed to a third entity of a third type in the 3D environment, sending, to a fourth application, an indication of a location corresponding to a first type of coordinate space for the third input, an orientation corresponding to the first type of coordinate space for the third input, a pose corresponding to the first type of coordinate space for the third input, a magnitude corresponding to the first type of coordinate space for the third input, or any combination thereof, wherein the first type of coordinate space is defined by the fourth application; and in accordance with a determination that a fifth set of one or more criteria is satisfied, wherein the fifth set of one or more criteria includes a criterion that is satisfied when the third input is directed to a fourth entity of a fourth type in the 3D environment, sending, to the fourth application, an indication of a location corresponding to a second type of coordinate space for the third input, an orientation corresponding to the second type of coordinate space for the third input, a pose corresponding to the second type of coordinate space for the third input, a magnitude corresponding to the second type of coordinate space for the third input, or any combination thereof, wherein the second type of coordinate space is defined by the fourth application, wherein the fifth set of one or more criteria is different from the fourth set of one or more criteria, wherein the fourth type of entity is different from the third type of entity, and wherein the second type of coordinate space is different from the first type of coordinate space.

28. The computer system of claim 21, wherein the second application is the first application.

29. The computer system of claim 21, wherein the second input includes a two-dimensional representation of the first input.

30. The computer system of claim 29, wherein translating the first input to the second input includes modifying a representation of a respective input from having six degrees of freedom to two degrees of freedom.

* * * * *